United States Patent
Hong et al.

(10) Patent No.: US 10,165,406 B2
(45) Date of Patent: Dec. 25, 2018

(54) METHOD OF PROVIDING ROUTE INFORMATION AND ELECTRONIC DEVICE FOR PROCESSING SAME

(71) Applicant: Samsung Electronics Co., Ltd., Gyeonggi-do (KR)

(72) Inventors: Hyunsu Hong, Gyeonggi-do (KR); Kyong-Ha Park, Gyeonggi-do (KR); Gongbo Moon, Gyeonggi-do (KR); Sanghoon Jeon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/180,402

(22) Filed: Jun. 13, 2016

(65) Prior Publication Data
US 2017/0041751 A1 Feb. 9, 2017

(30) Foreign Application Priority Data

Aug. 7, 2015 (KR) .................. 10-2015-0111752

(51) Int. Cl.
*H04W 4/02* (2018.01)
*H04W 4/029* (2018.01)
(Continued)

(52) U.S. Cl.
CPC .......... *H04W 4/023* (2013.01); *G01C 21/005* (2013.01); *G01C 21/10* (2013.01); *G01C 21/20* (2013.01);
(Continued)

(58) Field of Classification Search
CPC ..... H04W 4/023; H04W 4/027–4/029; H04W 64/006; G01C 21/005; G01C 21/10; G01C 21/20
See application file for complete search history.

(56) References Cited

U.S. PATENT DOCUMENTS 7,522,999 B2    4/2009   Wence et al.
7,603,233 B2 *  10/2009  Tashiro .................. G01C 21/30
                                                         342/357.31
(Continued)

FOREIGN PATENT DOCUMENTS

WO        2006/065679 A2    6/2006

OTHER PUBLICATIONS

European Search Report dated Jan. 2, 2017.
European Search Report; dated Apr. 4, 2018.

*Primary Examiner* — Wayne H Cai
(74) *Attorney, Agent, or Firm* — Cha & Reiter, LLC

(57) ABSTRACT

A method and an electronic device are disclosed. The electronic device includes at least one sensor, a reception module and a route information providing module, which executes the method, including determining, by the reception module, a present location as a first location in response to detecting occurrence of a first predetermined event, acquiring movement information by the at least one sensor when the electronic device moves from the first location, after moving from the first location, determining, by the reception module, a new present location as a second location in response to occurrence of a second predetermined event, the determination of the new present location including acquiring geographical location information corresponding to the second location, and generating route information corresponding to at least one interval between the first location and the second location based on at least a part of the acquired movement information and at least a part of the geographical location information.

16 Claims, 21 Drawing Sheets

(51) Int. Cl.
*G01C 21/00* (2006.01)
*G01C 21/10* (2006.01)
*G01C 21/20* (2006.01)
*H04W 64/00* (2009.01)

(52) U.S. Cl.
CPC ........... *H04W 4/027* (2013.01); *H04W 4/028* (2013.01); *H04W 4/029* (2018.02); *H04W 64/006* (2013.01)

(56) References Cited

U.S. PATENT DOCUMENTS

| | | |
|---|---|---|
| 8,457,880 B1 | 6/2013 | Malalur et al. |
| 8,718,936 B2 | 5/2014 | Fountain |
| 9,123,244 B2* | 9/2015 | Daman ................. G08G 1/127 |
| 2008/0208445 A1* | 8/2008 | Bolton ............... G01C 21/3614 |
| | | 701/533 |
| 2009/0228204 A1* | 9/2009 | Zavoli .................... G01C 21/30 |
| | | 701/532 |
| 2011/0191024 A1* | 8/2011 | DeLuca ................. G01C 21/28 |
| | | 701/472 |
| 2013/0059609 A1* | 3/2013 | Raento .............. H04M 1/72572 |
| | | 455/456.6 |
| 2013/0210459 A1 | 8/2013 | Takahashi |
| 2014/0028477 A1 | 1/2014 | Michalske |
| 2014/0046588 A1 | 2/2014 | Maezawa et al. |
| 2014/0114561 A1 | 4/2014 | Pakzad et al. |
| 2014/0232570 A1 | 8/2014 | Skinder et al. |
| 2015/0032505 A1* | 1/2015 | Kusukame ......... G06Q 30/0201 |
| | | 705/7.31 |
| 2015/0300826 A1* | 10/2015 | Hayashi ................ G01C 21/28 |
| | | 701/412 |
| 2016/0161259 A1* | 6/2016 | Harrison ................ G01S 19/48 |
| | | 701/409 |

* cited by examiner

METHOD OF PROVIDING ROUTE INFORMATION AND ELECTRONIC DEVICE FOR PROCESSING SAME

CLAIM OF PRIORITY

This application claims priority under 35 U.S.C. § 119(a) to Korean Application Serial No. 10-2015-0111752, which was filed in the Korean Intellectual Property Office on Aug. 7, 2015, the entire content of which is hereby incorporated by reference.

TECHNICAL FIELD

The present disclosure relates to an apparatus and a method for providing information related to a movement of an electronic device.

BACKGROUND

Electronic devices capable of complex performance of a plurality of functions are gradually increasing in number and diversity. A mainstream example of these electronic devices are mobile terminals called "smart phones." The mobile terminal is equipped with a display module having a large touch-enabled screen and a high pixel camera module, as well as the basic function for communication with a counterpart terminal. Therefore, the mobile terminal is capable of many functions, such as photographing a still image and a video, reproducing multimedia contents such as music and videos, and also performing web surfing by accessing a network. The mobile terminal as described above has a high performance processor. Even this aspect is continuously evolving/improving, and thus can the terminal can perform a diverse and growing list of functions.

Such electronic devices have also been equipped with a Global Positioning System (GPS) function and thus can provide a location-based service. For example, the electronic device may display registered places within a predetermined range based on a user's current location or, when the user searches for a destination which the user desires to visit in his/her current position, display a movement/directional line to the destination, in addition to information for travel, such as a remaining distance to the destination.

SUMMARY

An electronic device may provide a location-based service on the basis of a GPS function. For example, the electronic device may identify a location thereof through the GPS function and display the location on map information, so as to provide information on a user's current location and a user's movement route. However, while the electronic device can provide the location-based service in a state where the GPS function is activated, the location-based service may have an error in a state where the GPS function is deactivated.

Various embodiments of the present disclosure may provide an apparatus and a method for preventing generation of an error of a location-based service by an electronic device.

In one aspect of the present disclosure, an electronic device is provided including: at least one sensor, a reception module; and a route information providing module. The routine information providing module determines, by the reception module, a present location as a first location in response to detecting occurrence of a first predetermined event, acquires movement information by the at least one sensor when the electronic device moves from the first location, after moving from the first location, determines, by the reception module, a new present location as a second location in response to occurrence of a second predetermined event, the determination of the new present location including acquiring geographical location information corresponding to the second location, and generates route information corresponding to at least one interval between the first location and the second location based on at least a part of the acquired movement information and at least a part of the geographical location information.

In one aspect of the present disclosure, a method of operating an electronic device is disclosed, including determining a present location as a first location in response to detecting occurrence of a first predetermined event, acquiring movement information by at least one sensor when the electronic device moves from the first location, after moving from the first location, determining a new present location as a second location in response to occurrence of a second predetermined event, the determining of the new present location including acquiring geographical location information corresponding to the second location, and generating route information corresponding to at least one interval between the first location and the second location based on at least a part of the acquired movement information and a part of the geographical location information.

In one aspect of the present disclosure, an electronic device is disclosed, including: a communication module configured to receive location information corresponding to the electronic device, a sensor module configured to acquire movement information corresponding to the electronic device, and a processor electrically coupled to the communication module and the sensor module, and configured to: acquire the movement information indicating movement of the electronic device from a first point to a second point in response to generation of a location estimation event, in response to receiving location information of the electronic device at the second point, identify whether the acquired movement information satisfies a predetermined condition, and, when the acquired movement information satisfies the predetermined condition, estimate a location of the first point based on the location information of the electronic device at the second point and the acquired movement information.

In one aspect of the present disclosure, a computer-readable recording medium having a program recorded therein to execute operations in an electronic device is disclosed, the operations including: determining a present location as a first location in response to detected occurrence of a first predetermined event, acquiring movement information by at least one sensor when the electronic device moves from the first location, after moving from the first location, determining a new present location as a second location in response to occurrence of a second predetermined event, the determining of the new present location including acquiring geographical location information corresponding to the second location, and generating route information corresponding to at least one interval between the first location and the second location based on at least a part of the acquired movement information and at least a part of the acquired geographical location information.

BRIEF DESCRIPTION OF THE DRAWINGS

The present disclosure will be more apparent from the following detailed description taken in conjunction with the accompanying drawings, in which.

DETAILED DESCRIPTION

Figure 1:
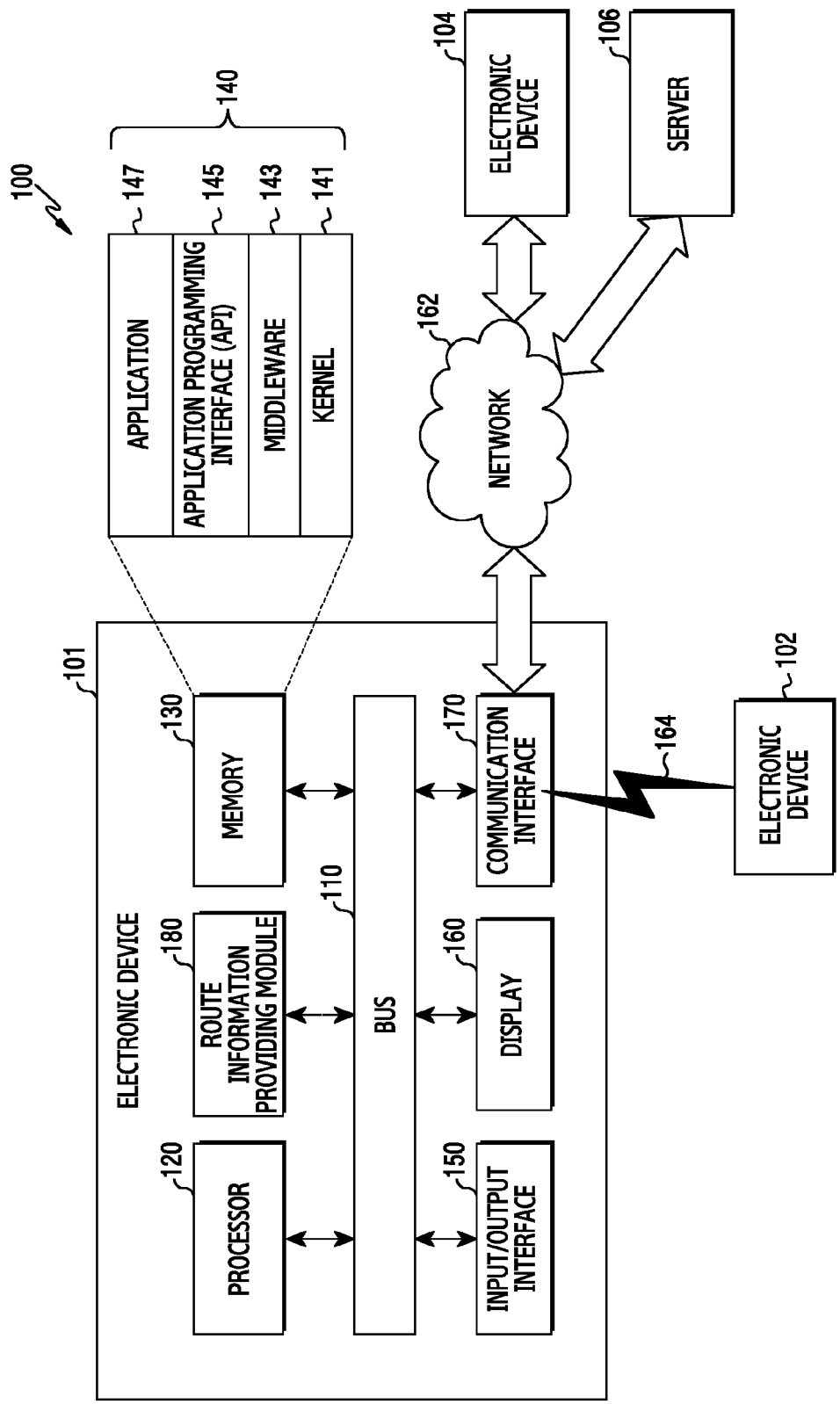
FIG. 1 illustrates an electronic device within a network environment according to various embodiments.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the present disclosure. In addition, descriptions of well-known functions and implementations are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™ PlayStation™; an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter).

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a view illustrating a network environment 100 including an electronic device 101 according to various embodiments. Referring to FIG. 1, the electronic device 101 may include a bus 110, a processor 120, a memory 130, an input/output (I/O) interface 150, a display 160, a communication interface 170, and a route information providing module 180.

The bus 110 may be a circuit for connecting the above-described elements (e.g., the processor 120, the memory 130, the I/O interface 150, the display 160, the communication interface 170 or the route information providing module 180, etc.) with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, the communication interface 170 or the route information providing module 180, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, the communication interface 170, or the route information providing module 180, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, a proximity, or hovering input by using an electronic pen or a part of the user's body.

The communication interface 170 may connect communication between the electronic device 101 and an external device (for example, the electronic device 104 or the server 106). For example, the communication interface 170 may be connected to a network 162 through wireless communication or wired communication, and may communicate with an external device. Similarly, the electronic device 102 may communicate with the electronic device 101 through direct communication 154, via wired or wireless communication.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The route information providing module 180 may generate route information corresponding to at least some intervals between a first location and a second location. According to various embodiments, the first location may be a location where a first predetermined event is generated, and the second location may be a location where a second predetermined event is generated. According to an embodiment, the route information providing module 180 may generate route information between the first location where a GPS function is deactivated and the second location where the GPS function is activated.

According to various embodiments, the route information providing module 180 may be functionally connected to a sensor module (for example, an acceleration sensor, a gyro sensor, a geomagnetic sensor, an altitude sensor, or the like) and identify at least one of the first location and the second location based on information received through the sensor module. According to various embodiments, the route information providing module 180 may be functionally connected to a communication module (for example, a GPS module, an NFC module, a Bluetooth module, or the like) and identify at least one of the first location and the second location based on information received through the communication module. According to various embodiments, the route information providing module 180 may be functionally connected to the display 160 and display route information corresponding to at least some intervals between the first location and the second location through the display 160. Additional information on the route information providing module 180 according to various embodiments will be provided through FIG. 4.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
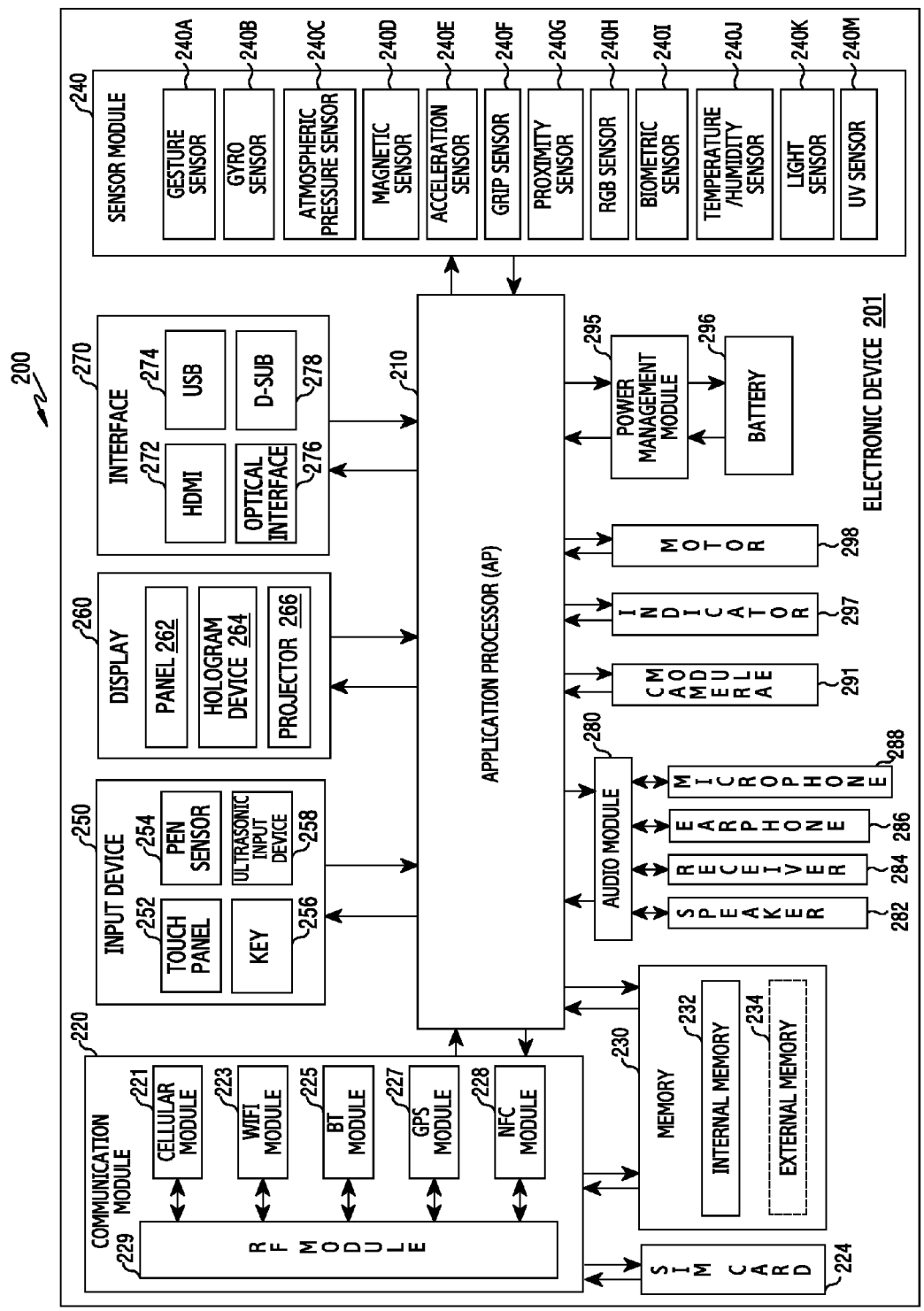
FIG. 2 is a block diagram of the electronic device according to various embodiments.

FIG. 2 is a block diagram 200 illustrating an electronic device 201 according to various embodiments of the present disclosure. The electronic device 201 may configure, for example, all or a portion of the electronic device 21 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include at least one of a graphic processing unit (GPU) or image signal processor. According to an embodiment, the AP 210 may be implemented to include at least a portion (e.g., the cellular module 221) of the above-described elements. Also, the AP 210 may stores data received from at least one of other elements or generated by at least one of other elements in a non-volatile memory.

The communication module 220 (e.g., the communication interface 170) may perform data transmission/reception in communication between the electronic device 201 (e.g., the electronic device 21) and other electronic devices (e.g., the electronic device 24 or the server 26) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC.

Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB or "red, green, blue" sensor), a biometric sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 160) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
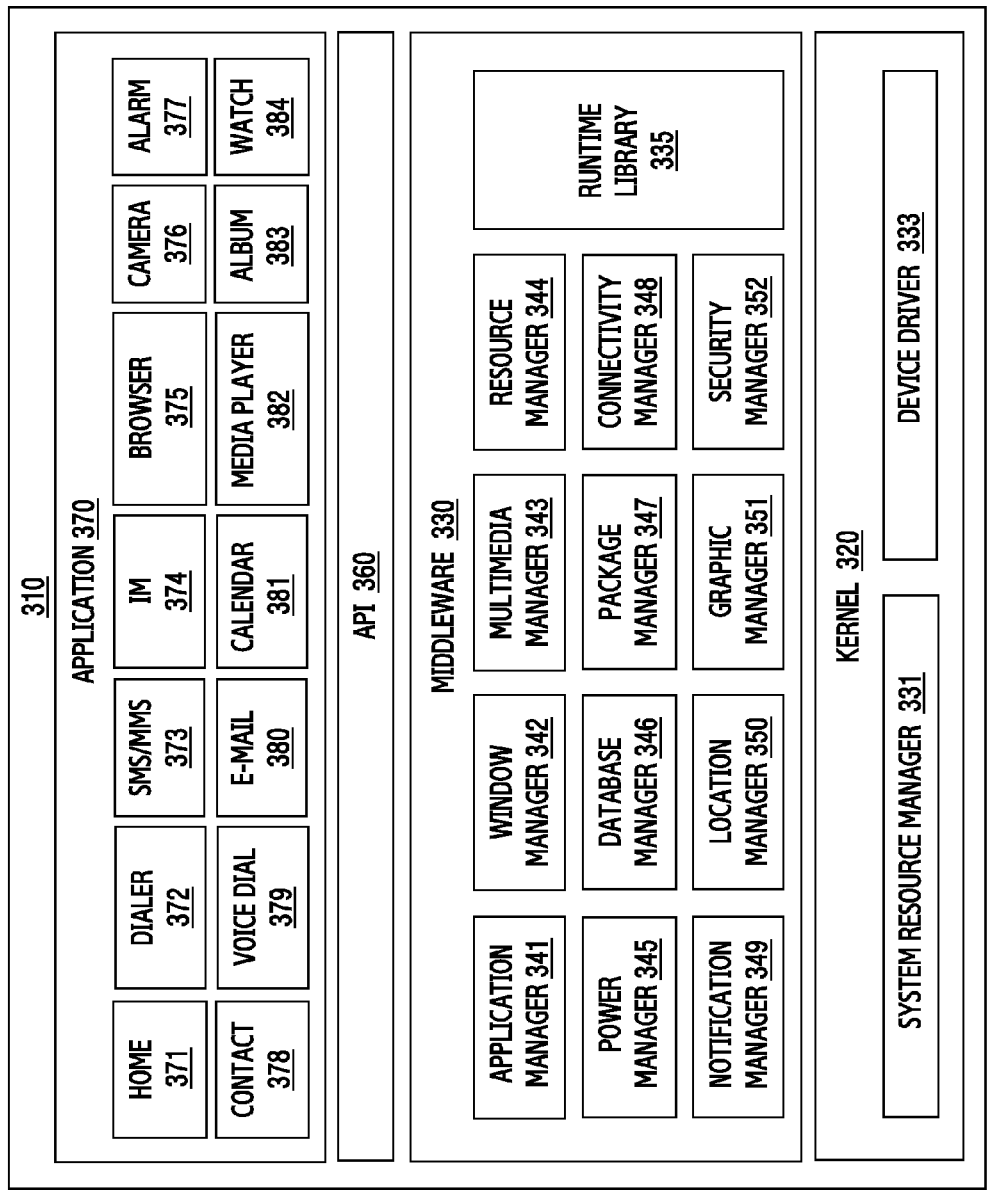
FIG. 3 is a block diagram of a program module according to various embodiments.

FIG. 3 is a block diagram 300 of a program module 310 according to various embodiments of the present disclosure.

According to an embodiment, the program module 310 (for example, the program module 140 of FIG. 1) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function utilized by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 331, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats utilized for the reproduction of various media files, and may perform an encoding or decoding of the media file by using a codec suitable for the corresponding format. The resource manager 331 may manage resources such as a source code, a memory, and a storage space of at least one of the applications 370.

The power manager 345 may operate together with a Basic Input/Output System (BIOS) to manage a battery or power and may provide power information utilized for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions utilized for system security or user authentication. According to an embodiment, when the electronic device (for example, electronic device 101) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, watch 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 101) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 101 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

Figure 4:
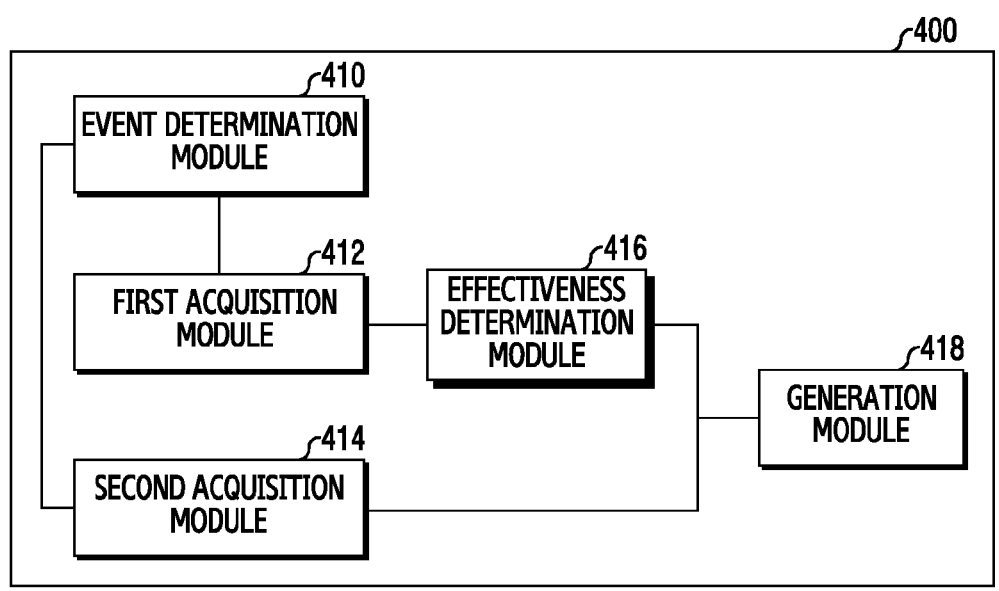
FIG. 4 illustrates a route information generating module according to various embodiments.

FIG. 4 illustrates a configuration of a route information providing module 400 according to various embodiments.

According to various embodiments, the route information providing module 400 may be the route information providing module 180 of the electronic device 101.

According to various embodiments, the route information providing module 400 may include an event determination module 410, a first acquisition module 412, a second acquisition module 414, an effectiveness determination module 416, and a generation module 418.

The event determination module 410 may detect generation of a predetermined event (for example, a first predetermined event) to acquire location information corresponding to a location change of the electronic device 101. According to various embodiments, the predetermined event may be relevant to deactivation of a positioning function (for example, a GPS function). For example, as entering a shadow area such as inside a building, the event determination module 410 may determine that reception of positioning information is not possible and determine that a predetermined event is generated at least based on the determination.

According to another embodiment, the predetermined event may be relevant to entering a predetermined point (for example, a point of interest). For example, the event determination module 410 may determine a location of the electronic device 101 and a movement of the electronic device 101 based on information received through a wireless communication scheme. According to an embodiment, the event determination module 410 may determine the entrance into a predetermined point based on information (for example, beacon information) received in a short-range communication scheme, for example, a communication scheme such as Bluetooth Low Energy (BLE), Bluetooth, Near Field Communication (NFC), Wi-Fi, or the like, and determine that a predetermined event is generated at least based on the determination.

According to another embodiment, the predetermined event may be relevant to a motion state of the electronic device 101. For example, the event determination module 410 may be electrically connected to at least one sensor, and determine a motion state (for example, a walking state, a running state, a stopped state, or the like) of the electronic device 101 by using the sensor. The event determination module 410 may determine a change in the motion state (for example, a change from the walking state to the running state, a change from the walking state to a car riding state, or the like) based on information acquired through the sensor, and determine that a predetermined event is generated at least based on the determination. According to another embodiment, the event determination module 410 may determine a state change based on a noise change, a vibration change, a magnetic field change, or the like. For example, the event determination module 410 may detect the change in noise, vibration, or magnetic field generated due to closing or opening of a car door or turning on or off of a car engine, and determine a motion state change (for example, getting on or out of a car) at least based on the detection.

According to another embodiment, the predetermined event may be relevant to function execution of the electronic device 101. For example, the event determination module 410 may determine the generation of a predetermined event in response to the determination of execution of a predetermined function (for example, photographing an image) among functions executed by an input. In another example, the event determination module 410 may determine the generation of a predetermined event in response to the determination of execution of a predetermined application (for example, health application) among applications executed by an input.

According to another embodiment, the predetermined event may be relevant to information received from at least one external device. For example, the event determination module 410 may determine the generation of a predetermined event in response to reception of a call from a predetermined user (or reception of a message from a predetermined user) or reception of a predetermined control command from an external device.

According to various embodiments, the event determination module 410 may control the first acquisition module 412 to acquire location information corresponding to a location change of the electronic device 101 in response to the determination of the generation of the predetermined event.

The first acquisition module 412 may acquire movement information of the electronic device 101 with respect to a location (for example, a first location) where the predetermined event is generated. According to an embodiment, the first acquisition module 412 may acquire movement information corresponding to a location of the electronic device 101 changed from the first location. For example, the first acquisition module 412 may acquire at least one of a movement distance, movement direction, movement time, bearing, speed, and altitude of the electronic device 101 based on information acquired through at least one of a gyro sensor, an acceleration sensor, a geomagnetic sensor, and an altitude sensor. According to an embodiment, the first acquisition module 412 may be functionally connected to a sensor for measuring a 3-axis acceleration and a sensor for detecting a 3-axis directivity and thus acquire at least one of a movement distance, movement direction, and movement time. According to another embodiment, the first acquisition module 412 may be functionally connected to a sensor for measuring a 3-axis acceleration, a sensor for detecting a 3-axis directivity, and a sensor for detecting a 3-axis geometric field, and thus acquire at least one of a movement distance, movement direction, movement time, bearing, and speed.

According to various embodiments, when a location (for example, a second location) which can be measured is identified during the acquisition of movement information, the first acquisition module 412 may stop an operation of acquiring the movement information. According to an embodiment, the first acquisition module 412 may acquire movement information corresponding to a location change of the electronic device 101 from the location (for example, the first location) where the first predetermined event is generated to the second location. According to various embodiments, even though the location (for example, the second location) which can be measured is identified during the acquisition of movement information, the first acquisition module 412 may perform the operation of acquiring the movement information.

The second acquisition module 414 may acquire geographical location information of the location (for example, the second location) which can be measured. According to an embodiment, the second acquisition module 414 may acquire location information (for example, latitude information, longitude information, altitude information, or the like) of a point where the electronic device is located by using a location measurement module. According to an embodiment, the location measurement module may be a module related to at least one of a satellite navigation system (for example, a global navigation satellite system) and a network location confirmation system (for example, a network location provider).

The effectiveness determination module 416 may determine effectiveness of the movement information acquired by the first acquisition module 412. The effectiveness determination module 416 may determine whether movement information which can be used for generating route information having predetermined accuracy is acquired. According to an embodiment, the effectiveness determination module 416 may determine effectiveness of the movement information based on a predetermined time range and a predetermined distance range. For example, the predetermined time may be, for example, 10 minutes. When movement information is acquired after a predetermined time (for example, 15 minutes), the effectiveness determination module 416 may determine that route information having predetermined accuracy cannot be generated based on the acquired movement information. When movement information is acquired within a predetermined time (for example, 8 minutes), the effectiveness determination module 416 may determine that route information having predetermined accuracy can be generated based on the acquired movement information.

According to various embodiments, the effectiveness determination module 416 may determine effectiveness of the movement information acquired using a sensor module and the movement information acquired using a measurement module. According to an embodiment, the effectiveness determination module 416 may identify a similarity between the movement information acquired based on the second location and a GPS signal. For example, the similarity may be provided to the route generation module 418 and used for generating route information.

The generation module 418 may generate route information based on movement information of the electronic device 101 acquired by the first acquisition module 412 and geographical location information acquired by the second acquisition module 414. According to various embodiments, the generation module 418 may generate route information on at least some intervals between the first location and the second location based on movement information and location information. According to various embodiments, the generation module 418 may use movement information having effectiveness among the movement information acquired by the first acquisition module 412 for generating route information. The movement information having the effectiveness may be a part of the movement information acquired by the first acquisition module 412. For example, the movement information having the effectiveness may be movement information acquired for a predetermined time (for example, 10 minutes) among movement information acquired for 15 minutes. According to various embodiments, the generation module 418 may generate route information based on a similarity (for example, similarity between movement information acquired based on the second location and a GPS signal) generated by the effective determination module 416. For example, the generation module 418 may generate the route information based on a similarity of a movement direction (for example, at least one direction of straight movement, right movement, and left movement) or correct the generated route information. "Similarity" may indicate a likeness between two information sources having an informational correspondence, correlation or match equal to or greater than a predetermined threshold.

According to various embodiments, the generation module 418 may correct the generated route information. According to an embodiment, the generation module 418 may correct the route information based on map information. For example, the route information may be displayed on map information, and, when the route information overlaps an obstacle of the map information (for example, a building, lake, overpass, underpass, or the like), the generation module 418 may correct the route information to not overlap the obstacle.

A terminology "module" used for the present disclosure may mean, for example, a unit including a combination of one or two or more among a hardware, a software, or a firmware. A "module" may be interchangeably used with a terminology such as a unit, a logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

According to various embodiments, at least a portion of an apparatus (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

An electronic device according to various embodiments may include at least one sensor, a reception module for receiving geographical location information, and a route information providing module. According to an embodiment, the route information providing module may be configured to determine a first location where a first predetermined event is generated in response to the first predetermined event, to acquire movement information corresponding to a location change of the electronic device from the first location by using the at least one sensor, to determine a second location where a second predetermined event is generated in response to the second predetermined event, the determination including an operation of acquiring geographical location information corresponding to the second location, and to generate route information corresponding to at least some intervals between the first location and the second location based on at least a part of the movement information and at least a part of the geographical location information.

According to various embodiments, the movement information may include a distance, direction, bearing, speed, altitude, time, or a combination thereof.

According to various embodiments, the route information providing module may be configured to determine the second location based on the first location and the movement information.

According to various embodiments, the route information providing module may be configured to acquire another movement information corresponding to an additional location change of the electronic device from the second location by using the at least one sensor, to determine a third location of the electronic device at least based on the other movement information, such that the determination including an operation of acquiring another geographical location information corresponding to the third location, to determine geographical movement information corresponding to the additional location change at least based on the geographical location information and the other geographical location information, to compare the geographical movement information and the other geographical movement information, and, when the geographical movement information and the other geographical movement information are similar to each other, to correct at least a part of the route information by using the geographical location information.

According to various embodiments, when the movement information is included in a predetermined utilized time or a predetermined movement distance, the route information providing module may be configured to generate the route information by using the movement information.

According to various embodiments, when the movement information is not included in a predetermined utilized time or a predetermined movement distance, the route information providing module may be configured to generate estimated route information with respect to some other intervals between the first location and the second location by using the movement information.

According to various embodiments, when the movement information does not meet a predetermined condition, the route information providing module may be configured to provide an interface for receiving information corresponding to some other intervals between the first location and the second location from a user.

According to various embodiments, the route information providing module may be configured to generate burnt calories of a user or energy consumption of a car involved with the user based on the route information.

According to various embodiments, the route information providing module may be configured to correct the movement information based on a map.

According to various embodiments, the route information providing module may be configured to control a period on which the geographical location information is acquired based on a speed or residual power of the electronic device.

According to various embodiments, the route information providing module may be configured to display the route information through a display functionally connected to the electronic device.

An electronic device according to various embodiments may include a communication module for receiving location information corresponding to the electronic device, a sensor module for acquiring movement information corresponding to the electronic device, and a processor electrically connected to the communication module and the sensor module. According to an embodiment, the processor may acquire the movement information from a first point to a second point in response to generation of a location estimation event, receive location information of the electronic device at the second point, identify the acquired movement information in response to the reception of the location information at the second point, and, when movement information, which meets a predetermined condition, is acquired, estimate a location of the first point based on the location information of the electronic device at the second point and movement information of the electronic device during movement from the first point to the second point.

According to various embodiments, the processor may display a route between the second point and the estimated first point.

According to various embodiments, the processor may reversely track from the second point to the first point by using the acquired movement information.

According to various embodiments, the processor may correct the estimated first point by comparing a location of the estimated first point with a pre-stored estimated history.

According to various embodiments, when movement information, which does not meet the predetermined condition, is acquired, the processor may estimate a location of the first point based on some movement information corresponding to the predetermined condition among the acquired movement information and location information of the electronic device at the second point.

According to various embodiments, when movement information, which does not meet the predetermined condition, is acquired, the processor may acquire a reference location for generation of route information through an input interface, and estimate a location of the first point based on at least one piece of the acquired route generation information, the acquired movement information, and the location information of the electronic device at the second point.

Figure 5:
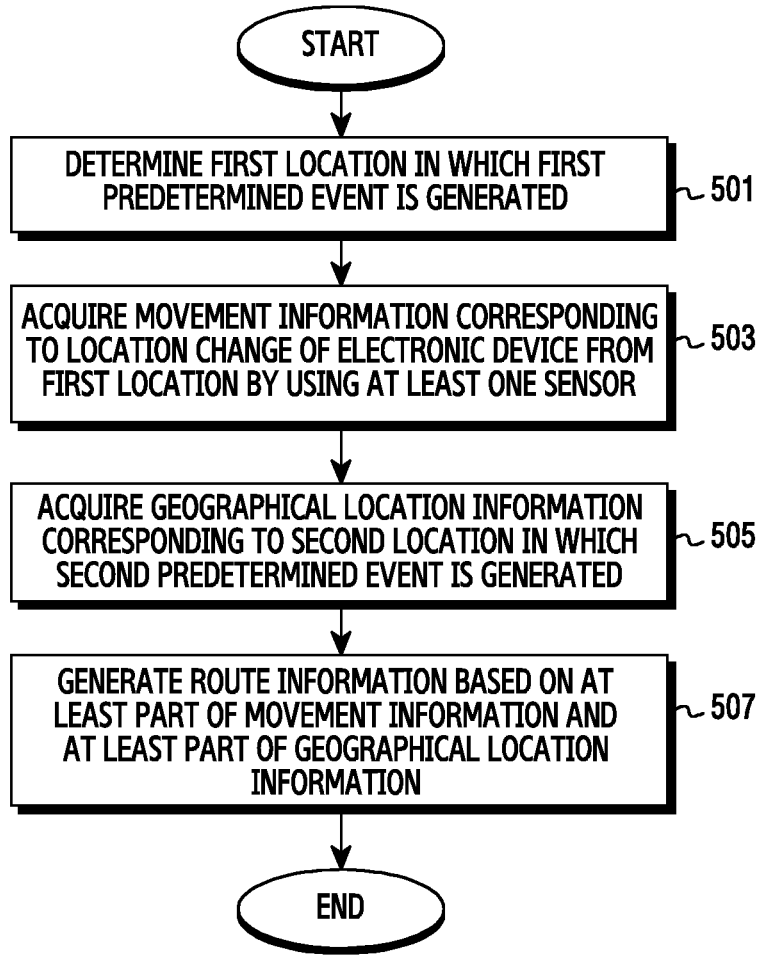
FIG. 5 is a flowchart illustrating an operation of a route information generating method according to various embodiments of the present disclosure.

FIG. 5 is a flowchart illustrating an operation of a route information generating method according to various embodiments of the present disclosure.

In operation 501, the electronic device 101 (for example, by the event determination module 410) may determine a first location where a first predetermined event is generated. According to various embodiments, the first predetermined event may include acquiring movement information of the electronic device 101 using at least one sensor (such as, for example, a gyro sensor, an acceleration sensor, a geomagnetic sensor, or the like).

According to an embodiment, the first predetermined event may be relevant to deactivation of a positioning function (for example, a GPS function). For example, when entering a shadowed or signal-obstructed area such as the interior of a building, the electronic device 101 (by, for example, the event determination module 410) may determine that reception of positioning information is not possible, and determine that the first predetermined event has been generated at least based on the determination.

According to another embodiment, the first predetermined event may be relevant to a predetermined point (such as, for example, a point of interest). For example, the electronic device 101 (by, for example, the event determination module 410) may determine a location of the electronic device 101 and detect movement of the electronic device 101, based on information received by a wireless communication or detect scheme. According to an embodiment, the electronic device 101 (by, for example, the event determination module 410) may determine the entrance into a predetermined access point, based on beacon information received via a short-range communication scheme, such as, for example, a communication scheme such as Bluetooth Low Energy (BLE), Bluetooth, Near Field Communication (NFC), Wi-Fi, or the like, and determine that the first predetermined event has been generated at least based on the determination.

According to another embodiment, the predetermined first event may be relevant to a motion state of the electronic device 101. For example, the electronic device 101 (by, for example, the event determination module 410) may determine a motion state (such as, for example, that a user carrying the device is walking, running, stopped, etc.) using at least one sensor. The electronic device 101 (by, for example, the event determination module 410) may determine a change in the motion state (such as, for example, a change from walking to running, a change from walking to transportation by vehicle, etc.) based on information acquired through a sensor, and determine that the first predetermined event has been generated at least based on the determination. In another example, the electronic device 101 (by, for example, the event determination module 410) may determine a state change based on changes in various environmental qualities, such as noise, vibration, magnetic field, etc. For example, the electronic device 101 (by for example, the event determination module 410) may detect changes in noise, vibration, or magnetic field generated when closing or opening a car door, or activation/deactivation of a car engine, and determine a motion state change at least based on the detection.

According to another embodiment, the first predetermined event may be relevant to function execution of the electronic device 101. For example, the electronic device 101 (by, for example, the event determination module 410) may determine the generation of the first predetermined event in response to the determination of execution of a predetermined function (such as, for example, photographing an image) from among functions executable by an input. In another example, the electronic device 101 (by, for example, the event determination module 410) may determine the generation of the first predetermined event in response to the determination of execution of a predetermined application (such as, for example, a health application or the like) among applications executed by an input.

According to another embodiment, the first predetermined event may be relevant to information received from at least one external device. For example, the electronic device 101 (by, for example, the event determination module 410) may determine the generation of the first predetermined event based on reception of a call from a predetermined user, or reception of a predetermined control command from an external device.

In operation 503, the electronic device 101 (by, for example, the first acquisition module 412) may acquire movement information corresponding to a location change of the electronic device 101 indicating movement from a first location by using at least one sensor. According to various embodiments, the electronic device 101 (by, for example, the first acquisition module 412) may acquire movement information in response to the generation of the first predetermined event. According to an embodiment, the movement information may include at least one of a movement distance, a movement direction, a movement time, a bearing, a speed, and an altitude of the electronic device 101.

In operation 505, the electronic device 101 (by, for example, the second acquisition module 414) may acquire location information corresponding to a second location where a second predetermined event is generated. According to various embodiments, the second predetermined event may be an event indicating acquisition of the location information corresponding to the second location. For example, the location information may include geographical location information corresponding to the second location.

According to an embodiment, the second predetermined event may be relevant to activation of a positioning function (such as, for example, a GPS function). For example, when leaving a "shadow" area such as the interior of a building, the electronic device 101 (by, for example, the event determination module 410) may determine that reception of positioning information is again possible and determine that the second predetermined event is generated at least based on the determination.

According to another embodiment, the second predetermined event may be relevant to entrance into a predetermined point (such as, for example, a point of interest). For example, the electronic device 101 (by, for example, the event determination module 410) may determine a location of the electronic device 101 and a movement of the electronic device 101 based on information received in a wireless communication scheme. According to an embodiment, the electronic device 101 (by, for example, the event determination module 410) may determine entrance into a second predetermined point based on beacon information received in a short-range communication scheme and determine that a second predetermined event is generated at least based on the determination.

According to another embodiment, the predetermined second event may be relevant to a motion state of the electronic device 101. For example, the electronic device 101 (by, for example, the event determination module 410) may determine a motion state (such as, for example, walking, running, or being stopped) by using at least one sensor. The electronic device 101 (by, for example, the event determination module 410) may determine a change in the motion state (such as, for example, a change from a second state to a third state) based on information acquired through a sensor, and determine that the second predetermined event is generated at least based on the determination. In another example, the electronic device 101 (by, for example, the event determination module 410) may determine a state change based on a change in external environment condition, such as noise, a vibration, magnetic field, etc.

According to another embodiment, the second predetermined event may be relevant to function execution of the electronic device 101. For example, the electronic device 101 (by, for example, the event determination module 410) may determine the generation of the second predetermined event in response to the determination of stopping of an executed function (such as, for example, photographing an image) or application (such as, for example, a health application).

According to another embodiment, the second predetermined event may be relevant to information received from at least one external device. For example, the electronic device 101 (by, for example, the event determination module 410) may determine the generation of the second predetermined event in response to reception of a call from a predetermined user, or reception of a predetermined control command from an external device.

In operation 507, the electronic device 101 (by, for example, the generation module 418) may generate route information based on at least a part of the movement information, and at least a part of the geographical location information. For example, the route information may include a first location as a starting point, and a second location as a destination. In another example, the route information may include the second location as the starting point and the first location as the destination. In another example, the route information may indicate at least one of the first location and the second location. In another example, the route information may be an intermediate location between the first location and the second location. In another example, the route information may be a location (such as, for example, a third location) including a predetermined range from at least one of the first location and the second location. According to various embodiments, the electronic device 101 may generate at least one piece, portion or part of the route information.

Figure 6:
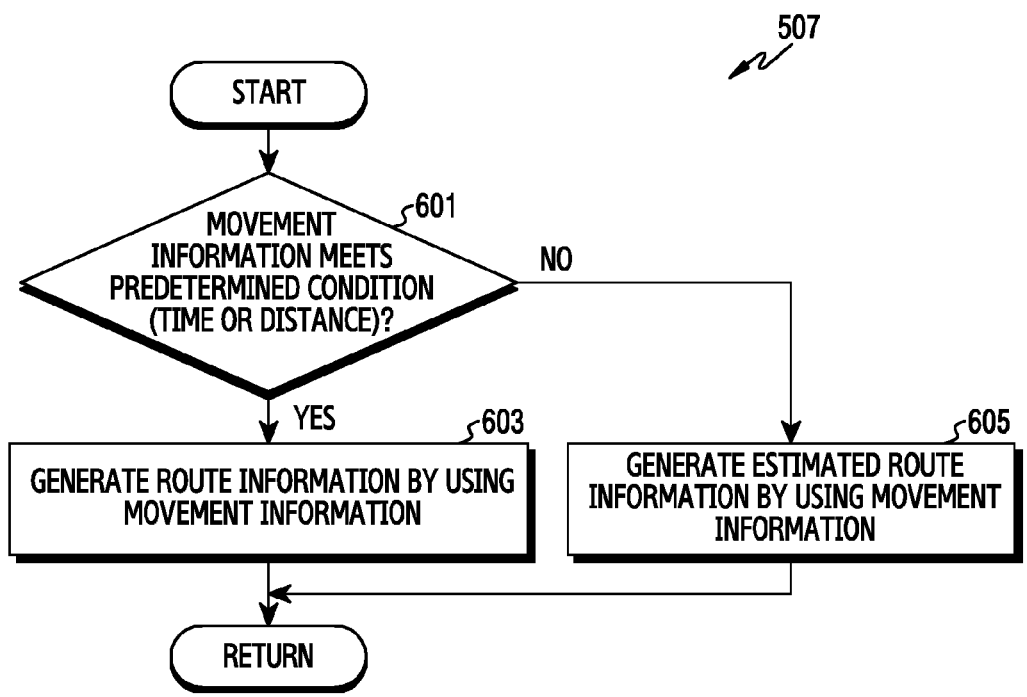
FIG. 6 is a flowchart illustrating an operation of a route information generating method according to various embodiments of the present disclosure.

FIG. 6 is a flowchart illustrating an operation of a route information generating method according to various embodiments of the present disclosure. The route information generating method according to various embodiments may correspond to a detailed operation of operation 507 illustrated in FIG. 5.

According to various embodiments, the electronic device 101 (for example, the generation module 418) may acquire movement information corresponding to a location change of the electronic device 101 from the first location by using at least one sensor in response to determination of the first location where the first predetermined event is generated, and acquire geographic location information corresponding to the second location where the second predetermined event is generated.

In operation 601, the electronic device 101 (by, for example, the effectiveness determination module 416) may determine whether movement information meets a predetermined condition. For example, the electronic device 101 (such as, for example, the effectiveness determination module 416) may determine whether movement information acquired through at least one sensor meets a predetermined condition. According to various embodiments, the predetermined condition may be an acquisition range of the movement information, which can be used to generate route information having predetermined accuracy. According to an embodiment, the predetermined condition may be relevant to at least one of a time and a distance. For example, the electronic device 101 (by, for example, the effectiveness determination module 416) may determine whether the movement information is acquired for a predetermined time. In another example, the electronic device 101 (by, for example, the effectiveness determination module 416) may determine whether the movement information is acquired while moving by a predetermined distance.

The electronic device 101 may generate route information by using the movement information in response to the acquisition of the movement information, which meets the predetermined condition, in operation 603. For example, the electronic device 101 (by, for example, the generation module 418) may generate route information based on the movement information, which meets the predetermined condition and the geographical location information.

The electronic device 101 (by, for example, the generation module 418) may generate estimated route information by using the movement information in response to the acquisition of the movement information that does not meet the predetermined condition, in operation 605. According to various embodiments, the electronic device 101 (such as, for example, the generation module 418) may determine that accurate route information cannot be generated based on the movement information, which does not meet the predetermined condition, and generate the estimated route information based on the movement information and the geographical location information. According to an embodiment, the estimated route information may be a moving route estimated based on the movement information, which does not meet the predetermined condition, or an area having a predetermined range estimated based on the movement information which does not meet the predetermined condition. The electronic device 101 (such as, for example, the generation module 418) may generate an estimated route based on a predetermined point of interest.

According to various embodiments, the electronic device 101 (by, for example, the generation module 418) may generate a plurality of pieces of estimated route information. The plurality of pieces of estimated route information may include main estimated route information and sub estimated route information, and the electronic device 101 (by, for example, the generation module 418) may generate the main estimated route information based on previously generated route information and a plurality of pieces of sub estimated route information based on the main estimated route information. The sub estimated route information may be a predicted route through which the user can move.

FIGS. 7A to 7E illustrate screen configurations of the electronic device to describe a route information generation situation according to various embodiments of the present disclosure.

According to various embodiments, the electronic device 101 may acquire movement information corresponding to a location change of the electronic device 101 from the first location by using at least one sensor in response to the determination of the first location where the first predetermined event is generated, and acquire geographic location information corresponding to the second location where the second predetermined event is generated. The first event may be deactivation of the positioning function, and the second event may be activation of the positioning function.

Figure 7A:
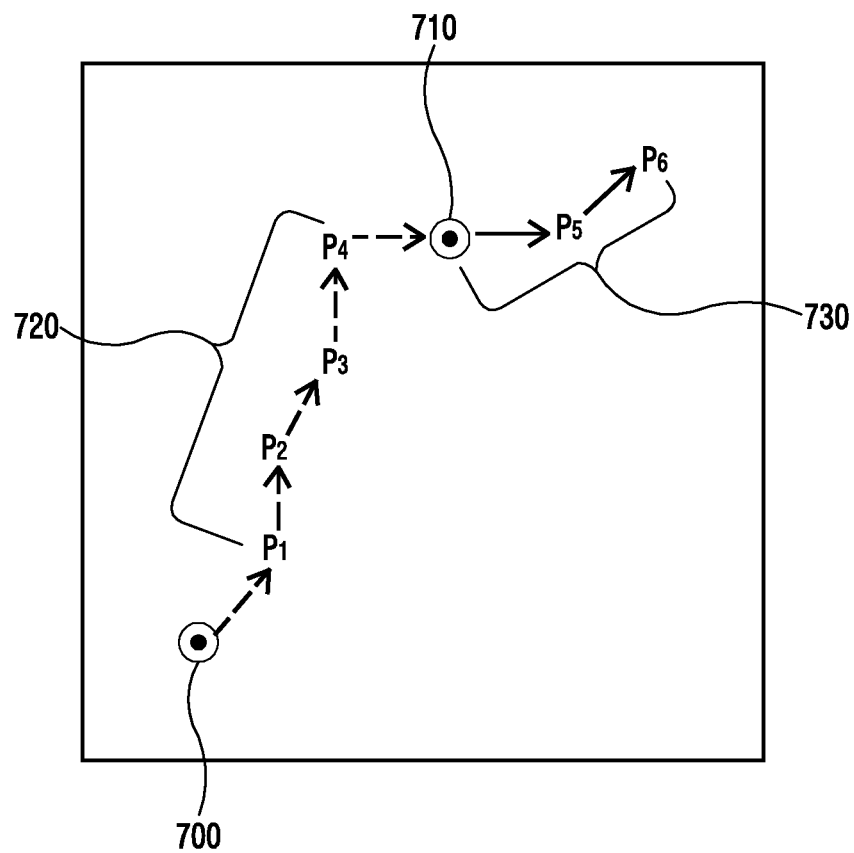
FIG. 7A, FIG. 7B, FIG. 7C, FIG. 7D and FIG. 7E illustrate screen configurations of the electronic device to describe a route information generation situation according to various embodiments of the present disclosure.

According to an embodiment, as illustrated in FIG. 7A, the electronic device 101 may acquire movement information 720 from a first location 700 to a second location 710. According to an embodiment, the electronic device 101 may continuously acquire the route movement information 730 even though the second predetermined event is generated. As illustrated in FIG. 7A, the electronic device 101 may acquire a movement direction, a movement distance, and a bearing from the first location where the positioning function is deactivated as the movement information 720. According to an embodiment, the electronic device 101 may acquire the movement information 720 of the electronic device 101 by using a sensor module, the acquisition occurring before the second predetermined event is generated. According to another embodiment, after the second predetermined event is generated, the electronic device 101 may acquire the location information 710 by using a location measurement module, or acquire the location information 710 by using both the sensor module and the location measurement module.

According to an embodiment, the electronic device 101 may generate the movement information 730 for the first location 700 based on the geographical location information acquired at the second location 710 by using the acquired movement information 720. According to an embodiment, the electronic device 101 may track-in-reverse the geographical location of the first location 700 based on the geographical location information acquired at the second location 710 by using the acquired movement information 720. The movement information used for generating the movement information 730 for the first location 700 may be movement information which meets the predetermined condition.

Figure 7B:
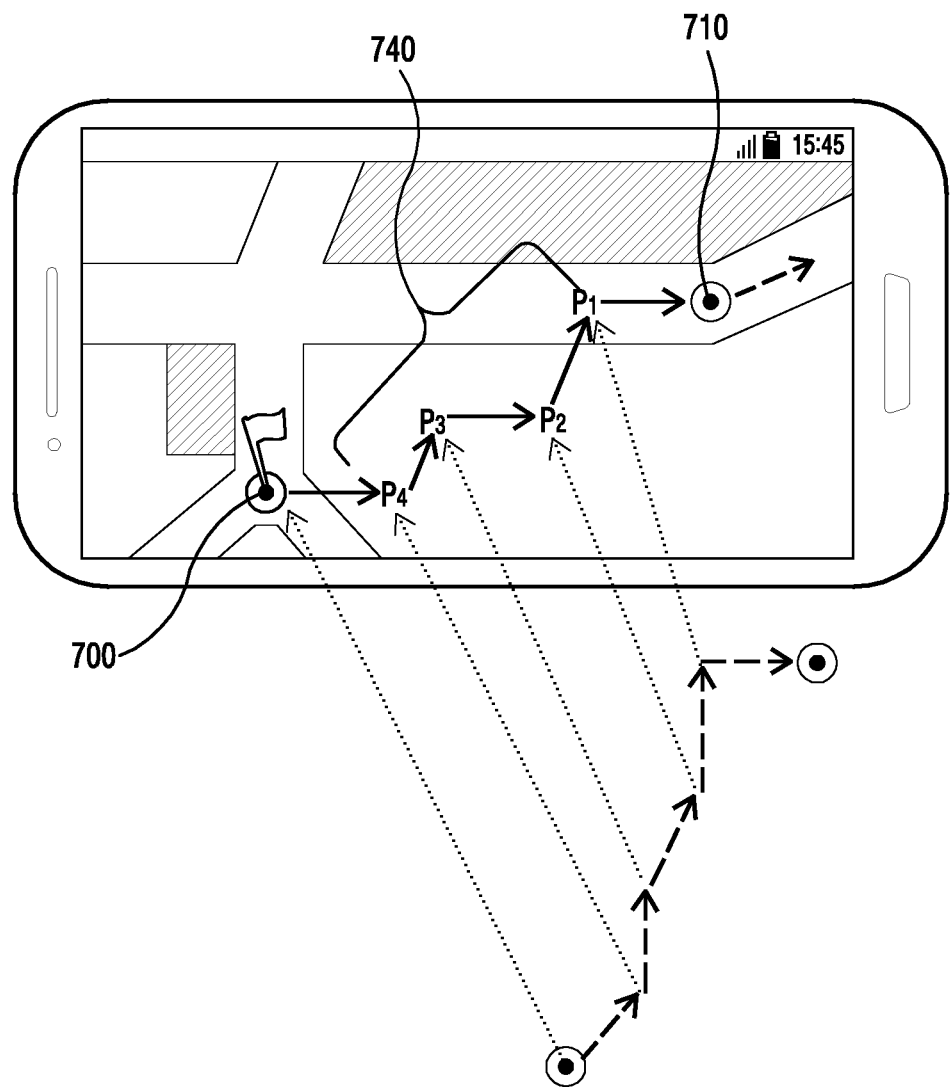

According to various embodiments, the electronic device 101 may generate estimated route information 740 by using the route movement information 730 acquired after the second predetermined event is generated. According to an embodiment, as illustrated in FIG. 7B, the electronic device 101 may match map data and route information based on the movement information acquired through the location measurement module.

According to various embodiments, the electronic device 101 may generate the estimated route information for the first location 700 based on the geographical location information acquired at the second location 710 by using the acquired movement information 720.

Figure 7C:
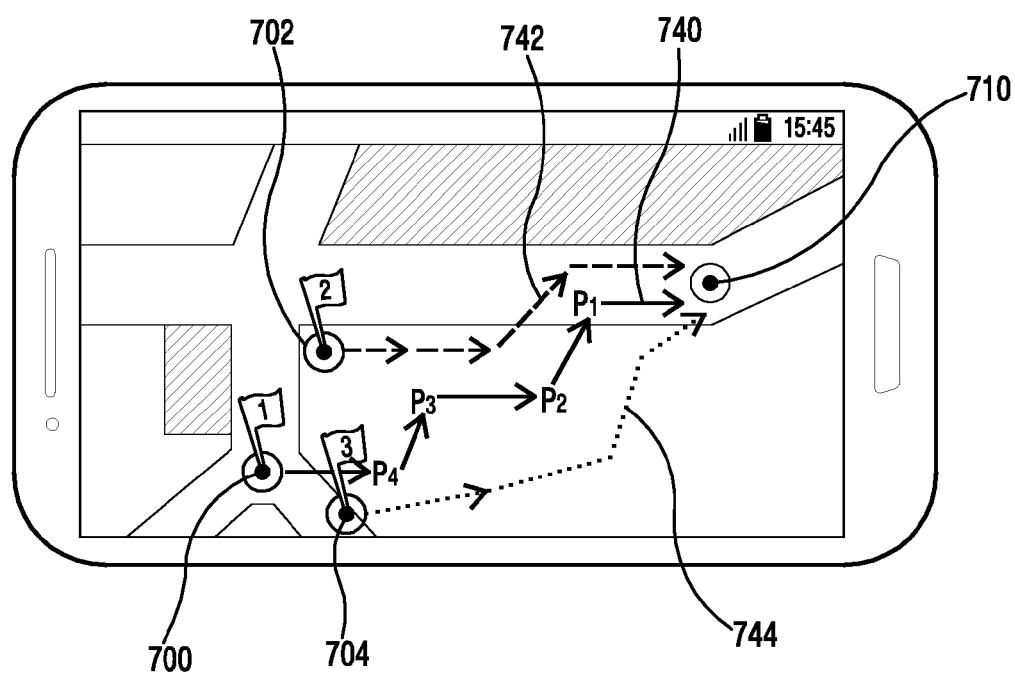

According to an embodiment, as illustrated in FIG. 7C, the electronic device 101 may generate estimated route information 740, 742, and 744 for the first location 700 based on the geographical location information acquired at the second location 710 by using the acquired movement information 720. According to an embodiment, the electronic device 101 may generate the estimated route information 740, 742, and 744 in response to the acquisition of the movement information which does not meet the predetermined condition. That is, the electronic device 101 may predict a route through which the user can move when determining that accurate route information cannot be generated because the movement information does not meet the predetermined condition.

For example, the electronic device 101 may generate the estimated route information 740 for the geographical location of the first location 700 based on the geographical location information acquired at the second location 710 using the movement information 720. In addition, the electronic device 101 may generate one or more pieces of "sub" estimated route information 742 and 744 for predicted positions 702 and 704 based on route information similar to the "main" estimated route information among the previously generated route information. According to various embodiments, the electronic device 101 may display the "sub" estimated route information 742 and 744 and the "main" estimated route information 740 to be separated from each other. For example, the route information may be displayed with different colors.

According to another embodiment, the electronic device 101 may determine effectiveness of the acquired movement information 720 and generate the estimated route information 740, 742, and 744 for the first location 700.

Figure 7D:
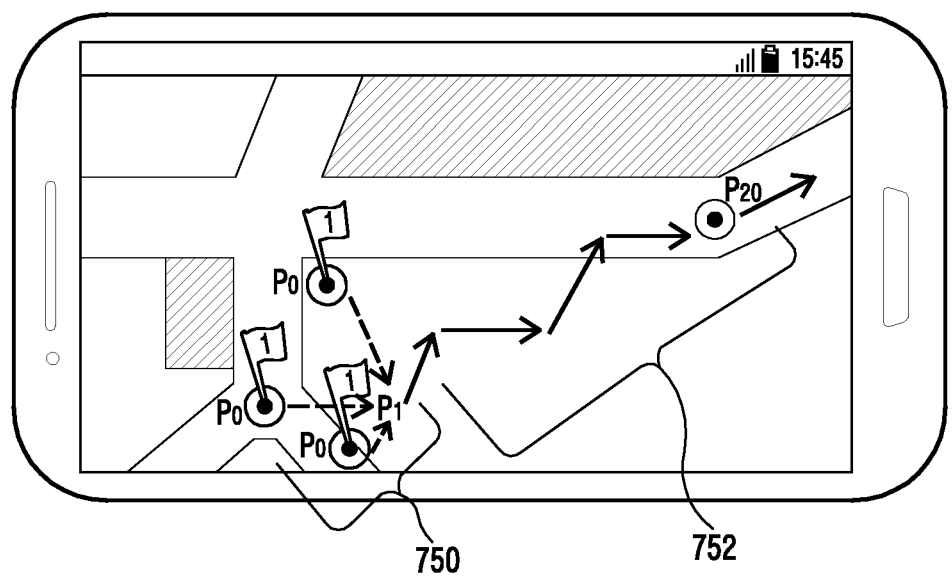

According to an embodiment, as illustrated in FIG. 7D, the electronic device 101 may generate the route information based on the movement information, which meets the predetermined condition, among the acquired movement information and generate the estimated route based on the movement information which does not meet the predetermined condition. For example, the electronic device 101 may generate route information 752 from a point $P_1$ to a second point P20 by using movement information having effectiveness and provide estimated route information 750 from a first point $P_0$ to the point $P_1$ by using movement information having no effectiveness.

Figure 7E:
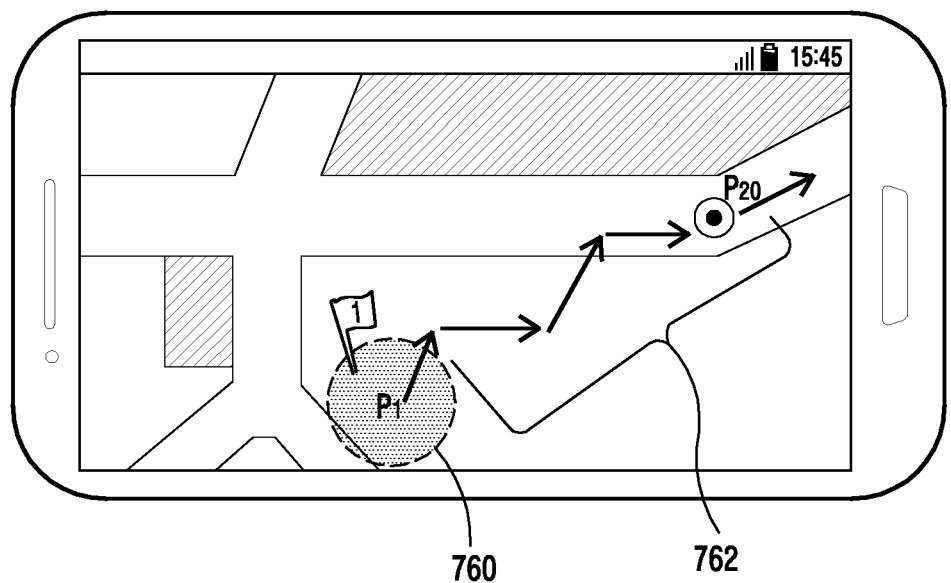

According to another embodiment, as illustrated in FIG. 7E, the electronic device 101 may generate estimated route information based on an area having a predetermined range by using the movement information which does not meet the predetermined condition. For example, the electronic device 101 may generate route information 762 from a point $P_1$ to a second point P20 by using movement information having a certain effectiveness, and provide, based on the estimated route information 760, an area including at least a part of the first point and the point $P_1$ by using movement information having no effectiveness.

Figure 8:
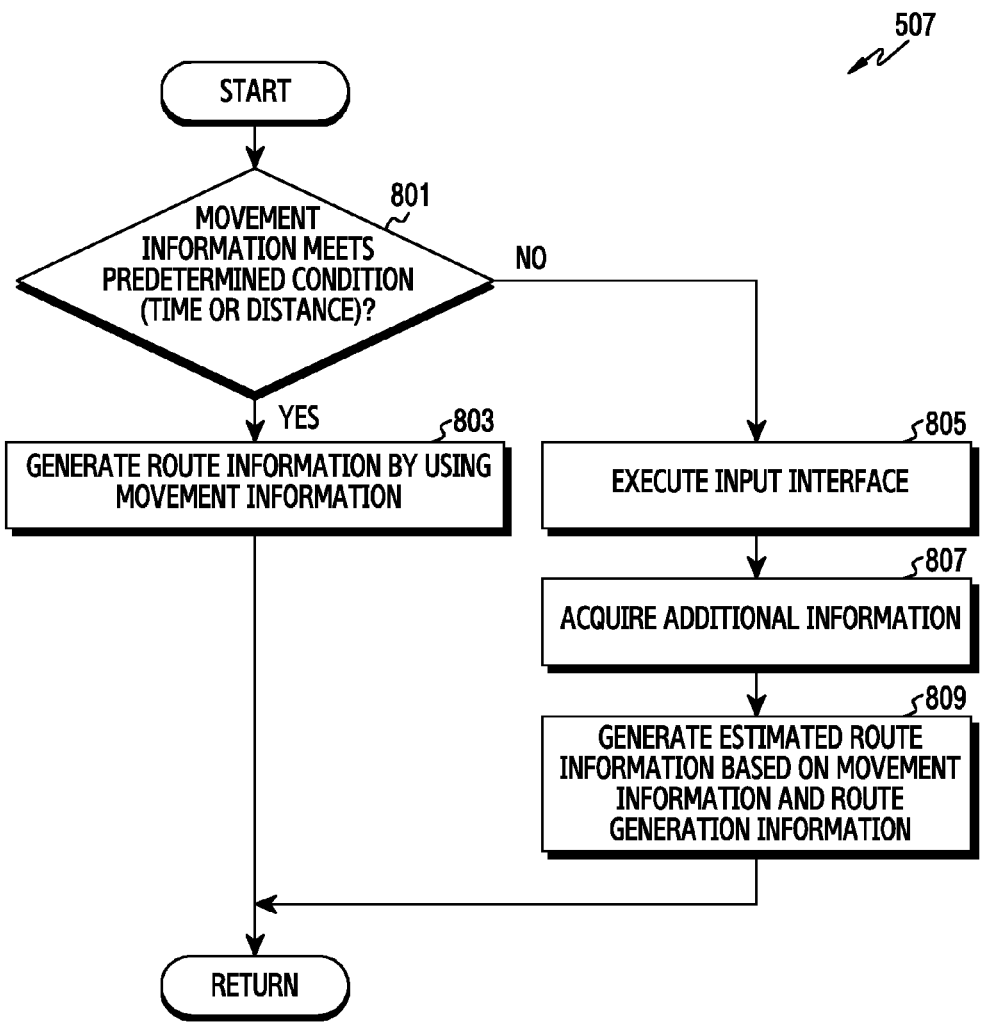
FIG. 8 is a flowchart illustrating an operation of a route information generating method according to various embodiments of the present disclosure.

FIG. 8 is a flowchart illustrating an operation of a route information generating method according to various embodiments of the present disclosure. The route information generating method according to various embodiments may correspond to a detailed operation of operation 507 illustrated in FIG. 5.

According to various embodiments, the electronic device 101 may acquire movement information corresponding to a location change of the electronic device 101 from the first location by using at least one sensor in response to the determination of the first location where the first predetermined event is generated, and acquire geographic location information corresponding to the second location where the second predetermined event is generated.

In operation 801, the electronic device 101 (by, for example, the effectiveness determination module 416) may determine whether movement information meets a predetermined condition. According to various embodiments, the predetermined condition may be an acquisition range of the movement information which can be used to generate route information having predetermined accuracy. According to an embodiment, the predetermined condition may be relevant to at least one of a time and a distance. For example, the electronic device 101 (by, for example, the effectiveness determination module 416) may determine whether movement information corresponding to a predetermined time is acquired. In another example, the electronic device 101 (by, for example, the effectiveness determination module 416) may determine whether the movement information corresponding to a predetermined distance is acquired.

The electronic device 101 (by, for example, the generation module 418) may generate route information by using the movement information in response to acquisition of the movement information which meets the predetermined condition, in operation 803. For example, the electronic device 101 (by, for example, the generation module 418) may generate route information based on the movement information, which meets the predetermined condition and the geographical location information.

The electronic device 101 (by, for example, the generation module 418) may execute an input interface in response to the acquisition of the movement information, which does not meet the predetermined condition in operation 805. According to an embodiment, the input interface corresponds to an interface for acquiring additional information and may receive additional information such as a points of interest, and/or location latitude, and longitude. According to an embodiment, the input interface may include at least one of a visual interface, a voice recognition interface, and an image recognition interface. According to an embodiment, a reference location for generating additional route information may include at least one of a starting point, an arrival point, and a stopover point.

In operation 807, the electronic device 101 (by, for example, the generation module 418) may acquire additional information through the executed input interface.

In operation 809, the electronic device 101 (by, for example, the generation module 418) may generate at least one piece of estimated route information based on movement information and route information. According to various embodiments, the electronic device 101 (by, for example, the generation module 418) may determine that accurate route information cannot be generated based on the movement information, which does not meet the predetermined condition, and generate additional route information based on at least one piece of movement information, geographical location information, and additional information. The additional route information may include main additional route information and sub additional route information. For example, the electronic device 101 (by, for example, the generation module 418) may generate at least one piece of additional route information corresponding to some non-trusted intervals among the movement information as illustrated in FIGS. 7C to 7E.

Figure 9A:
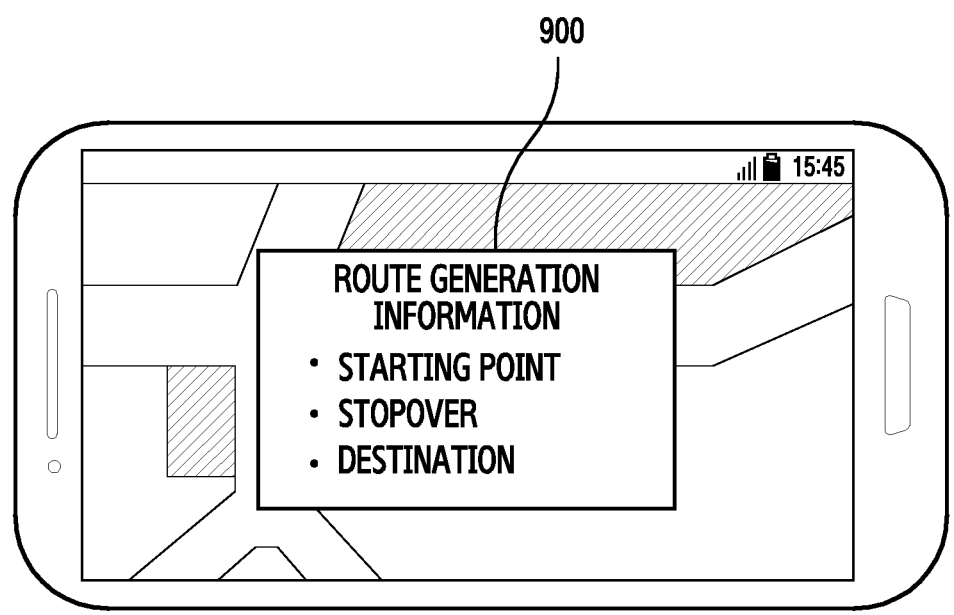
FIG. 9A and FIG. 9B illustrate screen configurations of the electronic device to describe a route generation information acquisition situation according to various embodiments of the present disclosure.
Figure 9B:
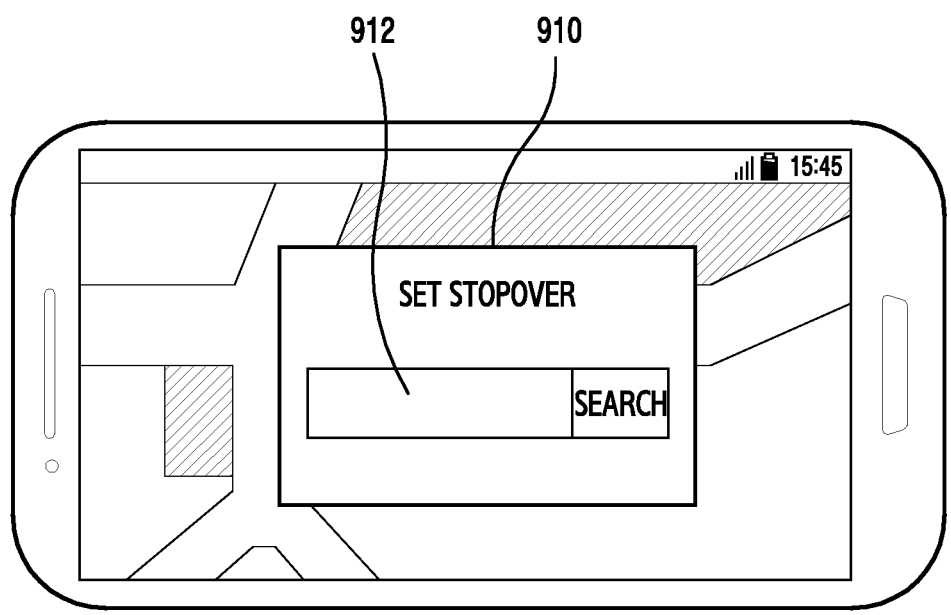

FIGS. 9A and 9B illustrate screen configurations of the electronic device to describe a route generation information acquisition situation according to various embodiments of the present disclosure.

According to various embodiments, the electronic device 101 may acquire movement information corresponding to a location change of the electronic device 101 from a first location. The movement information is acquired using at least one sensor in response to successful determination of the first location where the first predetermined event was generated, and acquisition of geographic location information corresponding to a second location where a second predetermined event is generated, which together may aid in generating route information.

According to various embodiments, the electronic device 101 may execute an input interface in response to the acquisition of the movement information which does not meet the predetermined condition.

As illustrated in FIG. 9A, the electronic device 101 may display an input interface 900 which allows selection of at least one item among a starting point (for example, a point of departure), a stopover point (for example, an interim point along a route), and an arrival point (for example, a destination) of the route information. Although a visual input interface is depicted in the drawings, the electronic device 101 may alternatively or complementarily execute a voice recognition interface and receive additional information via audio information, or execute an image recognition interface and acquire an image to be used as additional information.

According to an embodiment, when the item (such as, for example, the stopover item) of the displayed additional information through the input interface, the electronic device 101 may display a screen 910 for inputting stopover information as illustrated in FIG. 9B. For example, a screen 912 for receiving a point of interest, latitude, and longitude information may be displayed.

Figure 10:
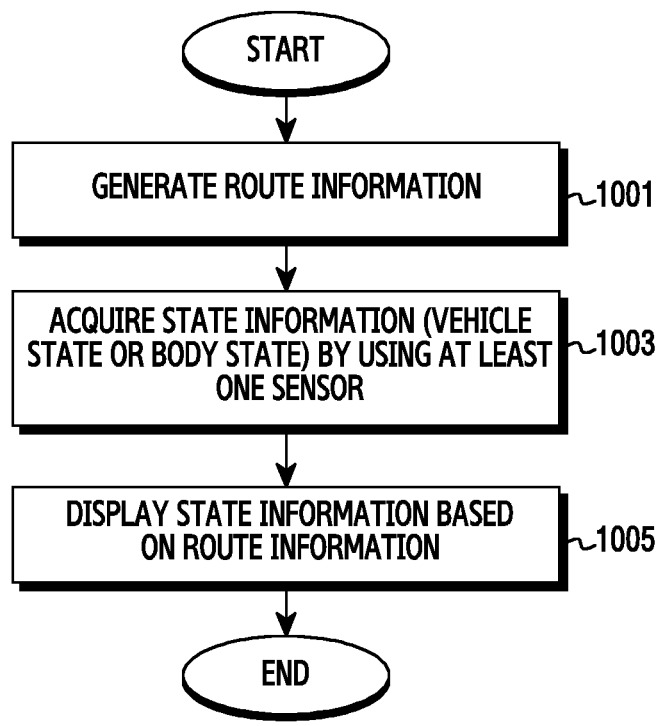
FIG. 10 is a flowchart illustrating an operation of a route information generating method according to various embodiments of the present disclosure.

FIG. 10 is a flowchart illustrating an operation of a route information generating method according to various embodiments of the present disclosure.

In operation 1001, the electronic device 101 (by, for example, the generation module 418) may generate route information. According to various embodiments, the electronic device 101 (by, for example, the generation module 418) may generate route information based on movement information from the first location to the second location and at least one piece of geographical location information.

In operation 1003, the electronic device 101 (by, for example, the first acquisition module 412) may acquire state information by using at least one sensor. According to various embodiments, the state information may be relevant to at least one of a car state and a user's body state. For example, the electronic device 101 (by, for example, the first acquisition module 412) may identify a car driving state such as a movement distance, average fuel efficiency, instant fuel efficiency, and steering direction through a connection with a second electronic device (for example, On Board Diagnostics (OBD), CAR-KIT, or the like) within the car. In another example, the electronic device 101 (for example, the first acquisition module 412) may identify a user's body state such as burnt calorie information and fatigue information based on information acquired from the sensor included in the electronic device 101 or the second electronic device worn on the user's body.

In operation 1005, the electronic device 101 (for example, the first acquisition module 412) may display the state information acquired based on the route information. According to an embodiment, the electronic device 101 may display information related to the car driving state and the user's body state based on the route information.

Figure 11A:
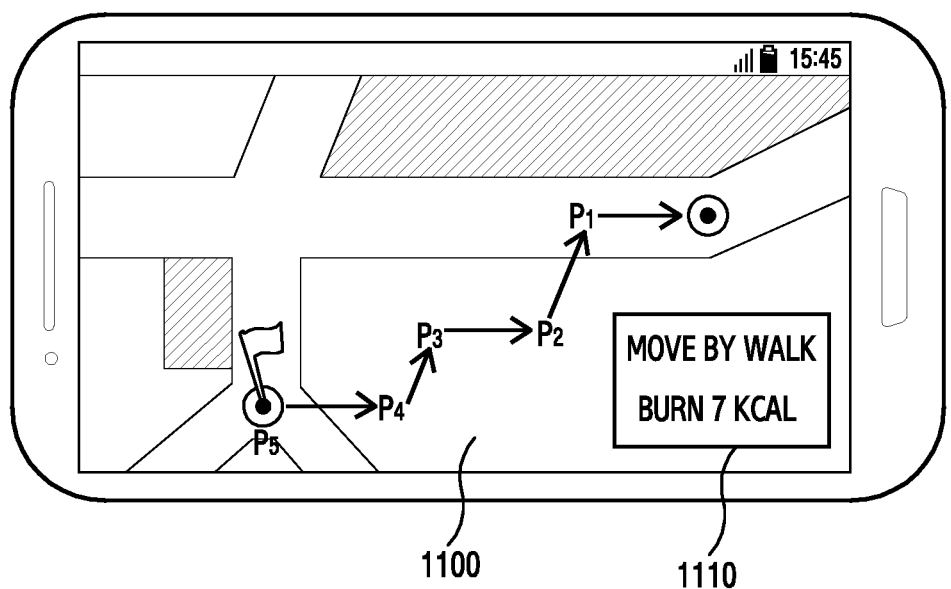
FIG. 11A and FIG. 11B illustrate screen configurations of the electronic device to describe a route information display situation according to various embodiments of the present disclosure.
Figure 11B:
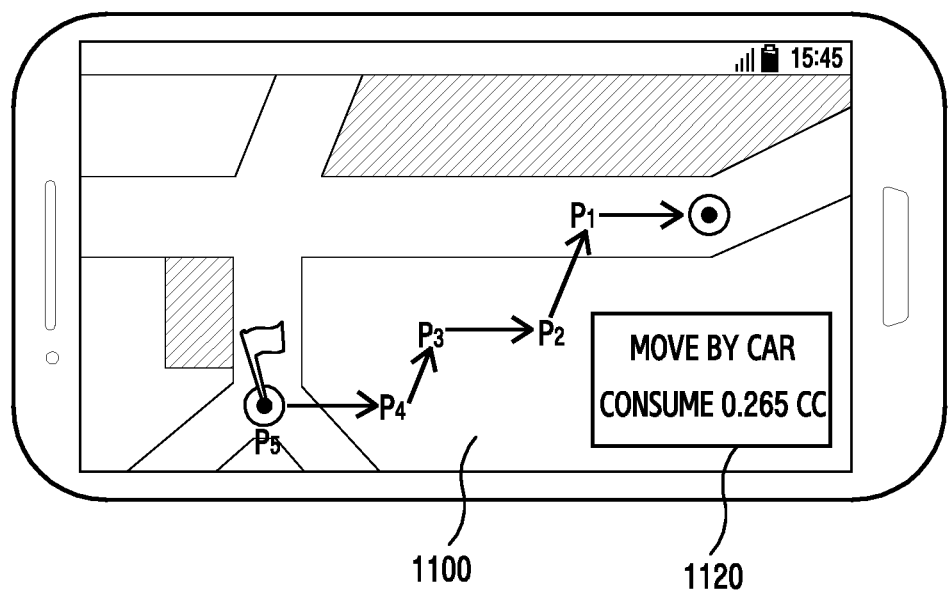

FIGS. 11A and 11B illustrate screen configurations of the electronic device to describe a route information display situation according to various embodiments of the present disclosure.

According to various embodiments, the electronic device 101 may acquire movement information corresponding to a location change of the electronic device 101 from the first location by using at least one sensor in response to the determination of the first location where the first predetermined event is generated, and acquire geographic location information corresponding to the second location where the second predetermined event is generated, so as to generate route information.

According to various embodiments, the electronic device 101 may identify a car state (e.g., whether a user is traveling in a car) and a body state (e.g., whether a user is traveling by walking, running, etc.) related to a user's movement by using at least one sensor. According to various embodiments, the electronic device 101 may display the car state and the body state along with the route information.

For example, as illustrated in FIG. 11A, the electronic device 101 may display an amount of consumed calories 1110 caused by walking, the calories 1110 displayed along with route information 1100 on the screen. In addition, when displaying the route information, the electronic device 101 may also display altitude information (and/or other information, such as a tilt).

Similarly, in another example, as illustrated in FIG. 11B, the electronic device 101 may display a quantity of fuel consumption 1120 in accordance with movement of a car along with route information 1100 on the screen.

Figure 12:
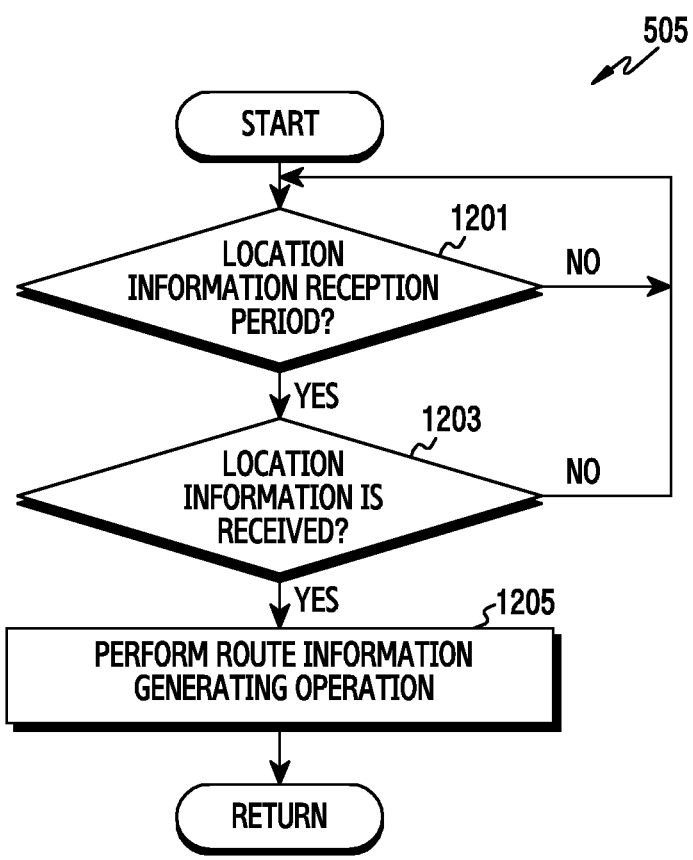
FIG. 12 is a flowchart illustrating an operation of a location information receiving method according to various embodiments of the present disclosure.

FIG. 12 is a flowchart illustrating an operation of a location information receiving method according to various embodiments of the present disclosure. The location information receiving method according to various embodiments may correspond to a detailed operation of operation 505 illustrated in FIG. 5.

According to various embodiments, the electronic device 101 may acquire movement information corresponding to a location change of the electronic device 101 from the first location by using at least one sensor in response to the determination of the first location where the first predetermined event is generated, and acquire geographic location information corresponding to the second location where the second predetermined event is generated.

In operation 1201, the electronic device 101 (by, for example, the second acquisition module 414) may identify whether a location information reception period arrives (e.g., matches a present time). According to an embodiment, the electronic device 101 (by, for example, the second acquisition module 414) may receive location information on a predetermined time period. According to various embodiments, the location information reception period may be set or changed based on at least one of a movement speed and an amount of residual battery (e.g., remaining battery power) of the electronic device 101 (by, for example, the second acquisition module 414).

When the location information reception period does not arrive in operation 1201, the electronic device 101 (by, for example, second acquisition module 414) may not receive location information and determine whether the location information reception period arrives in operation 1201.

When the location information reception period arrives in operation 1201, the electronic device 101 (by, for example, the second acquisition module 414) may identify whether the location information is received in operation 1203. According to an embodiment, the location information may be geographical location information.

When the location information is not received in operation 1201, the electronic device 101 (for example, the second acquisition module 414) may again determine whether the location information reception period arrives in operation 1201.

When the location information is received in operation 1203, the electronic device 101 (by, for example, the generation module 418) may perform a route information generating operation in operation 1205. According to various embodiments, the electronic device 101 (by, for example, the generation module 418) may generate route information based on movement information from the first location to the second location and at least one piece of geographical location information.

Figure 13:
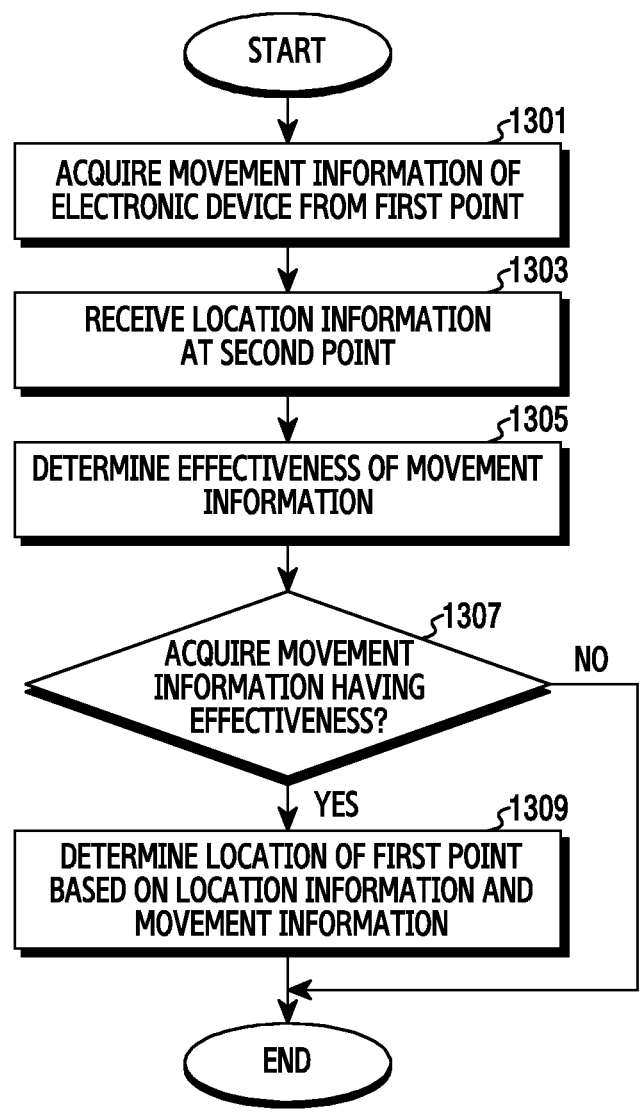
FIG. 13 is a flowchart illustrating an operation of a route information generating method according to various embodiments of the present disclosure.

FIG. 13 is a flowchart illustrating an operation of a route information generating method according to various embodiments of the present disclosure.

In operation 1301, the electronic device 101 (by, for example, the first acquisition module 412) may acquire movement information of the electronic device 101 from the first point. According to various embodiments, the electronic device 101 (by, for example, the first acquisition module 412) may acquire movement information (for example, a movement distance, a movement direction, a movement time, a bearing, a speed, and an altitude of the electronic device 101) corresponding to a location change of the electronic device 101 from the first point where the first predetermined event is generated through at least one sensor (by, for example, a gyro sensor, an acceleration sensor, and a geomagnetic sensor). According to various embodiments, the electronic device 101 (by, for example, the event determination module 410) may determine the generation of the first predetermined event based on deactivation of the positioning function, entrance into the predetermined point, and the change in the motion state.

In operation 1303, the electronic device 101 (by, for example, the second acquisition module 414) may receive location information of the second point. According to various embodiments, the electronic device 101 may acquire geographical location information of the second point where the second predetermined event is generated. For example, the electronic device 101 (by, for example, the second acquisition module 414) may acquire geographical location information (for example, latitude information, longitude information, and altitude information) in response to activation of the positioning function which was in the deactivated state).

In operation 1305, the electronic device 101 (by, for example, the effectiveness determination module 416) may perform an operation of determining effectiveness of the movement information. According to an embodiment, the operation of determining the effectiveness may be an operation of determining whether movement information acquired from the first point to the second point meets a predetermined condition. The predetermined condition may be an acquisition range of the movement information which can be used to generate route information having predetermined accuracy. According to an embodiment, the electronic device 101 may determine whether movement information corresponding to a range related to at least one of a predetermined time and a predetermined distance is acquired as a result of the determination of the effectiveness.

In operation 1307, the electronic device 101 (by, for example, the effectiveness determination module 416) may determine whether movement information having effectiveness is acquired.

When it is determined that the movement information having the effectiveness is not acquired (such as, for example, when it is determined that movement information having a predetermined time or longer or a predetermined distance or longer is acquired), the electronic device 101 (for example, the generation module 418) may not perform an operation of generating route information. For example, although the route information can be generated based on the movement information, the electronic device 101 (for example, the generation module 418) may determine route information, which cannot meet a predetermined accuracy, is generated and thus may not generate the route information.

When it is determined that the movement information having the effectiveness is acquired in operation 1307 (such as, for example, when it is determined that movement information within a predetermined time or a predetermined distance is acquired), the electronic device 101 (for example, the generation module 418) may determine a location of the first point based on the location information and the movement information in operation 1309.

Figure 14:
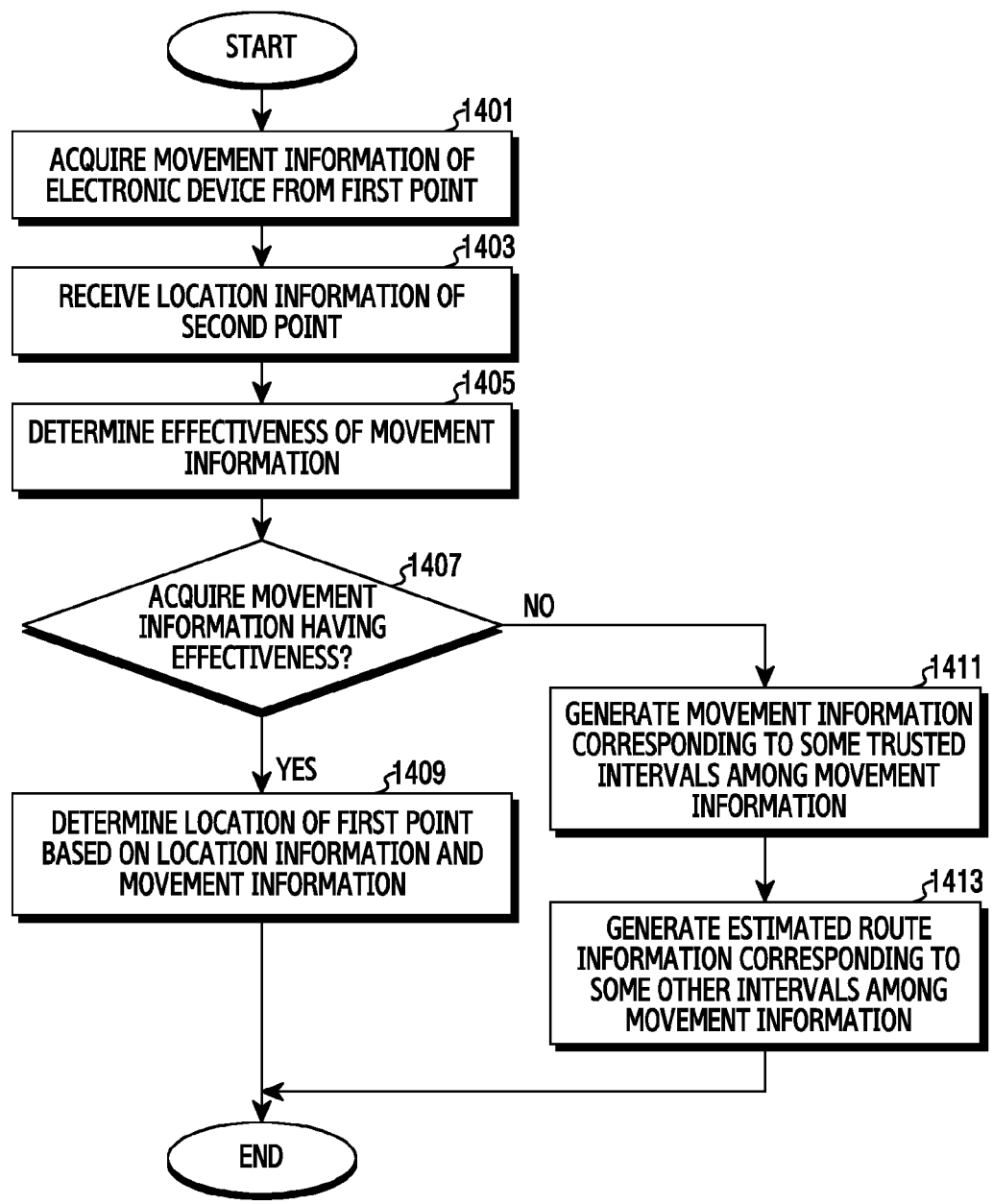
FIG. 14 is a flowchart illustrating an operation of a route information generating method according to various embodiments of the present disclosure.

FIG. 14 is a flowchart illustrating an operation of a route information generating method according to various embodiments of the present disclosure.

In operation 1401, the electronic device 101 (for example, the first acquisition module 412) may acquire movement information of the electronic device 101 from the first point. According to various embodiments, the electronic device 101 (for example, the first acquisition module 412) may acquire movement information (for example, a movement distance, a movement direction, a movement time, a bearing, a speed, and an altitude of the electronic device 101) corresponding to a location change of the electronic device 101 from the first point where the first predetermined event is generated through at least one sensor (for example, a gyro sensor, an acceleration sensor, and a geomagnetic sensor). According to various embodiments, the electronic device 101 (for example, the first acquisition module 412) may determine the generation of the first predetermined event based on deactivation of the positioning function, entrance into the predetermined point, and the change in the motion state.

In operation 1403, the electronic device 101 (for example, the second acquisition module 414) may receive location information of the second point. According to various embodiments, the electronic device 101 may acquire geographical location information of the second point where the second predetermined event is generated. For example, the electronic device 101 (for example, the second acquisition module 414) may acquire geographical location information (for example, latitude information, longitude information, and altitude information) in response to activation of the positioning function which was in the deactivated state.

In operation 1405, the electronic device 101 (for example, the effectiveness determination module 416) may perform an operation of determining effectiveness of the movement information. According to an embodiment, the operation of determining the effectiveness may be an operation of determining whether movement information acquired from the first point to the second point meets the predetermined condition. The predetermined condition may be an acquisition range of the movement information which can be used to generate route information having predetermined accuracy. According to an embodiment, the electronic device 101 (for example, effectiveness determination module 416) may determine whether movement information corresponding to a range related to at least one of a predetermined time and a predetermined distance is acquired as a result of the determination of the effectiveness.

In operation 1407, the electronic device 101 (for example, the effectiveness determination module 416) may determine whether movement information having effectiveness is acquired.

When it is determined that the movement information having the effectiveness is acquired (for example, when it is determined that movement information within a predetermined time or a predetermined distance is acquired), the electronic device 101 (for example, the generation module 418) may determine a location of the first point based on the location information and the movement information in operation 1409.

When it is determined that the movement information having the effectiveness is not acquired (for example, when it is determined that movement information having a predetermined time or longer or a predetermined distance or longer is acquired), the electronic device 101 (for example, the generation module 418) may generate route information corresponding to some trusted intervals among the movement information in operation 1411. According to an embodiment, when movement information of a range of 1.2 km is acquired in a state where it is defined that movement information acquired within a range of 1 km has effectiveness, the electronic device 101 (for example, the generation module 418) may acquire movement information corresponding to some trusted intervals (for example, within a range of 1 km in a direction from the second point to the first point) among the movement information of the range of 1.2 km and generate route information corresponding to the trusted interval.

In operation 1413, the electronic device 101 (for example, the generation module 418) may generate estimated route information corresponding to some other intervals among the movement information. According to various embodiments, the electronic device 101 (for example, the generation module 418) may generate estimated route information corresponding to some non-trusted intervals among the movement information. According to an embodiment, the electronic device 101 (for example, the generation module 418) may acquire movement information corresponding to a non-trusted interval (for example, an interval of 0.2 km escaping from a predetermined range of 1 km) among movement information of a range of 1.2 km and generate estimated route information corresponding to the non-trusted interval. According to an embodiment, the electronic device 101 (for example, the generation module 418) may generate at least one piece of estimated route information corresponding to the non-trusted interval as illustrated in FIG. 7D. According to another embodiment, the electronic device 101 (for example, the generation module 418) may generate estimated route information of an area having a predetermined range as illustrated in FIG. 7E.

Figure 15:
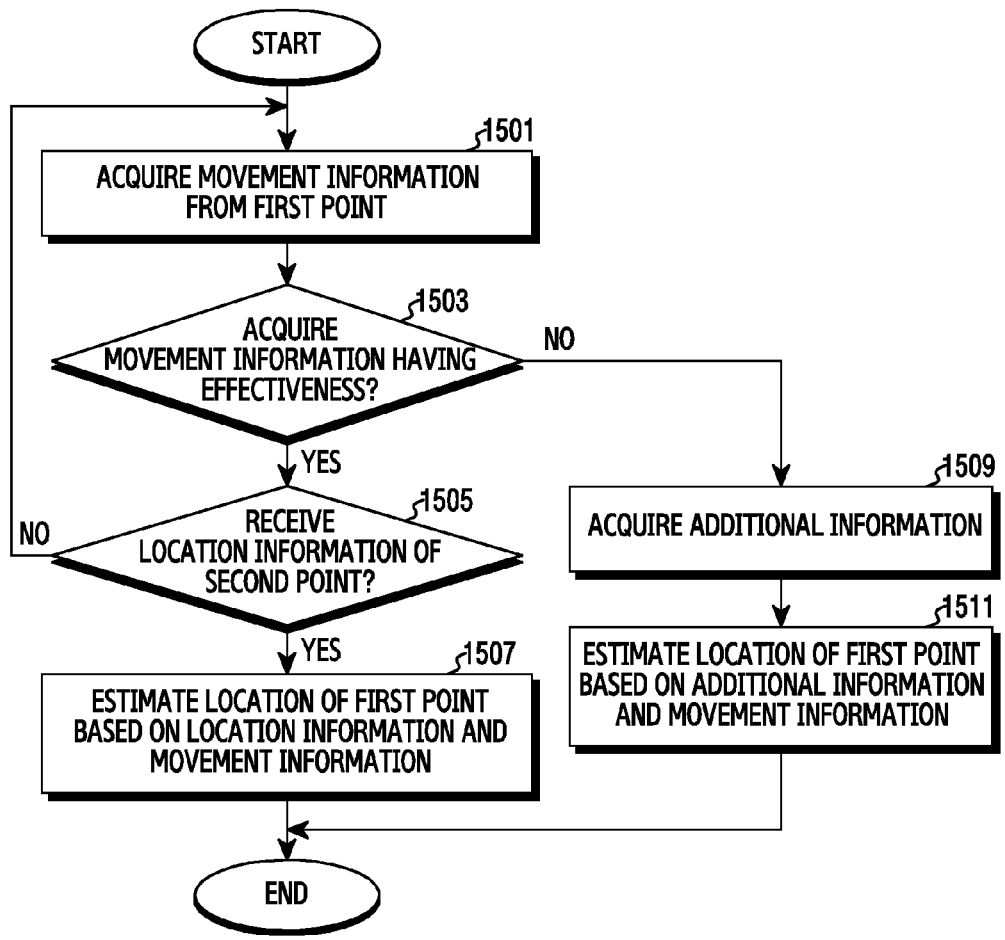
FIG. 15 is a flowchart illustrating an operation of a route information generating method according to various embodiments of the present disclosure.

FIG. 15 is a flowchart illustrating an operation of a route information generating method according to various embodiments of the present disclosure.

In operation 1501, the electronic device 101 (for example, the first acquisition module 412) may acquire movement information of the electronic device 101 from the first point. According to various embodiments, the electronic device 101 (for example, the first acquisition module 412) may acquire movement information (for example, a movement distance, a movement direction, a movement time, a bearing, a speed, and an altitude of the electronic device 101) corresponding to a location change of the electronic device 101 from the first point where the first predetermined event is generated through at least one sensor (for example, a gyro sensor, an acceleration sensor, and a geomagnetic sensor). According to various embodiments, the electronic device 101 (for example, the event determination module 410) may determine the generation of the first predetermined event based on deactivation of the positioning function, entrance into the predetermined point, and the change in the motion state.

In operation 1503, the electronic device 101 (for example, the effectiveness determination module 416) may determine whether movement information having effectiveness is acquired. According to an embodiment, the operation of determining the effectiveness may be an operation of determining whether movement information acquired from the first point according to a location change of the electronic device 101 meets the predetermined condition.

The electronic device 101 (for example, the second acquisition module 414) may identify whether location information of the second point is received in response to the acquisition of the movement information having the effectiveness in operation 1505. According to various embodiments, the electronic device 101 may acquire geographical location information of the second point where the second predetermined event is generated. For example, the electronic device 101 (for example, the second acquisition module 414) may acquire geographical location information (for example, latitude information, longitude information, and altitude information) in response to activation of the positioning function which was in the deactivated state.

In operation 1507, the electronic device 101 (for example, the generation module 418) may estimate a location of the first point based on location information and movement information in response to the reception of location information of the second point.

The electronic device 101 (for example, the second acquisition module 414) may re-perform the operation of identifying the reception of the location information in response to the non-reception of the location information of the second point. In another example, the electronic device 101 (for example, the first acquisition module 412) may re-perform the operation relevant to operation 1501.

The electronic device 101 may acquire additional information in response to the acquisition of the movement information having no effectiveness in operation 1509. According to various embodiments, the electronic device 101 (for example, the generation module 418) may acquire additional information by executing an interface for acquiring the additional information. According to an embodiment, the additional information may be information such as a point of interest, latitude, or longitude, and may be acquired through at least one of a visual interface, a voice recognition interface, and an image recognition interface.

In operation 1511, the electronic device 101 (for example, the generation module 418) may estimate the location of the first point based on the additional information and the movement information.

According to various embodiments, the electronic device 101 (for example, the generation module 418) may determine that accurate route information cannot be generated based on the movement information, which does not meet the predetermined condition, and generate at least one piece of route information based on additional information received from the user.

A method of operating an electronic device according to various embodiments may include an operation of determining a first location where a first predetermined event is generated in response to the first predetermined event, an operation of acquiring movement information corresponding to a location change of the electronic device from the first location by using at least one sensor, an operation of determining a second location where a second predetermined event is generated in response to the second predetermined event, the determining of the second condition including acquiring geographical location information corresponding to the second location, and an operation of generating route information corresponding to at least some intervals between the first location and the second location based on at least a part of the movement information and a part of the geographical location information.

According to various embodiments, the movement information may include a distance, direction, bearing, speed, altitude, time, or a combination thereof.

According to various embodiments, the operation of determining the second location may include determining the second location based on the first location and the movement information.

According to various embodiments, the operation of generating the route information may include an operation of acquiring another movement information corresponding to an additional location change of the electronic device from the second location by using the at least one sensor, an operation of determining a third location of the electronic device at least based on the other movement information, such that the determination including an operation of acquiring another geographical location information corresponding to the third location, an operation of determining geographical movement information corresponding to the additional location change at least based on the geographical location information and the other geographical location information, an operation of comparing the geographical movement information and the other geographical movement information, and, when the geographical movement information and the other geographical movement information are similar to each other, an operation of correcting at least a part of the route information by using the geographical location information.

According to various embodiments, when the movement information is included in a predetermined utilized time or a predetermined movement distance, the operation of generating the route information may include an operation of generating the route information by using the movement information.

According to various embodiments, the operation of acquiring the geographical location information may include an operation of controlling a period on which the geographical location information is acquired based on a speed or residual power of the electronic device.

According to various embodiments, when the movement information is included in a predetermined utilized time or a predetermined movement distance, the operation of generating the route information may include an operation of generating the route information by using the movement information.

According to various embodiments, when the movement information is not included in a predetermined utilized time or a predetermined movement distance, the operation of generating the route information may include an operation of generating estimated route information with respect to some other intervals between the first location and the second location by using the movement information.

According to various embodiments, when the movement information does not meet a predetermined condition, the operation of generating the route information may include an operation of providing an interface for receiving information corresponding to some other intervals between the first location and the second location from a user.

According to various embodiments, the operation of generating the route information may include an operation of generating burnt calories of a user or energy consumption of a car involved with the user based on the route information.

According to various embodiments, the operation of generating the route information may include an operation of correcting the movement information based on a map.

According to various embodiments, the operation of generating the route information may include an operation of displaying the route information through a display functionally connected to the electronic device.

A method of operating an electronic device according to various embodiments may include an operation of acquiring movement information from a first point to a second point in response to generation of a location estimation event, an operation of receiving location information of the electronic device at the second point, an operation of identifying the acquired movement information in response to the reception of the location information at the second point, and, when movement information which meets a predetermined condition is acquired, estimating a location of the first point based on the location information of the electronic device at the second point and movement information of the electronic device during the movement from the first point to the second point.

According to various embodiments, the estimating the location may include an operation of displaying a route between the second point and the estimated first point.

According to various embodiments, the operation of estimating the location may include an operation of reversely tracking from the second point to the first point by using the acquired movement information.

According to various embodiments, the operation of estimating the location may include an operation of correcting the estimated first point by comparing a location of the estimated first point with a pre-stored estimated history.

According to various embodiments, when movement information, which does not meet the predetermined condition, is acquired, the operation of estimating the location may include an operation of estimating a location of the first point based on some movement information corresponding to the predetermined condition among the acquired movement information and location information of the electronic device at the second point.

According to various embodiments, when movement information, which does not meet the predetermined condition, is acquired, the operation of estimating the location may include an operation of acquiring a reference location for generation of route information through an input interface, and estimating a location of the first point based on at least one piece of the acquired route generation information, the acquired movement information, and the location information of the electronic device at the second point.

A method of providing route information and an electronic device for processing the method according to various embodiments can provide route information corresponding to movement information by using location information acquired in a state where positioning is possible even though the movement information is acquired by using a sensor in a state where the positioning is not possible. Further, although a user's activity is performed in a state where a function related to the positioning is deactivated, information corresponding to the user's activity can be provided using the location information acquired in the state where the function related to the positioning is activated.

Various embodiments disclosed herein are provided merely to easily describe technical details of the present disclosure and to help the understanding of the present disclosure, and are not intended to limit the present disclosure. Accordingly, the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:

1. An electronic device comprising:
    at least one global positioning system (GPS) sensor;
    at least one sensor;
    at least one processor;
    at least one memory storing programming instructions executable by the at least one processor to cause the electronic device to:
        in response to detecting that GPS detection is unavailable by the GPS sensor, determine a present location by the at least one sensor as a first location where GPS detection is initially unavailable;
        acquire movement information by the at least one sensor as the electronic device moves from the first location while the GPS detection is unavailable;
        in response to detecting reactivation of GPS detection by the GPS sensor, detect a new present location by the GPS sensor, the new present location indicating a second location detected via absolute geographic location information detected by the GPS sensor;
        determine whether at least one of an acquisition time of the acquired movement information and an acquisition distance of the acquired movement information satisfies a pre-determined condition indicating at least one of a requisite time and distance; and
        in response to detecting that the at least one of the acquisition time and the acquisition distance satisfies the pre-determined condition, generate historical route information indicating at least one interval between the first location and the second location previously traversed by the electronic device while GPS detection was unavailable, based on the acquired movement information detected while GPS detection was unavailable, and the new present location detected by the reactivated GPS detection.

2. The electronic device of claim 1, wherein the acquired movement information includes at least one of distance, direction, bearing, speed, altitude, time, the programming instructions further executable by the at least one processor to cause the electronic device to
    in response to detecting that the at least one of the acquisition time and the acquisition distance fails to satisfy the pre-determined condition, execute display of an input interface requesting input of additional geographic information relevant; and
    generate the historical route information based on the acquired movement information, the new present location, and the additional geographic information received via the input interface.

3. The electronic device of claim 1, wherein the programming instructions are further executable by the at least one processor to cause the electronic device to:
    acquire another movement information by the at least one sensor when the electronic device moves from the second location;
    after moving from the second location, determine another new present location as a third location of the electronic device at least based on the another movement information, the determination of the another new present location including acquiring another geographical location information corresponding to the third location;
    to determine new geographical movement information corresponding movement from the second location at least based on the absolute geographical location information and the another geographical location information;
    to compare the new geographical movement information and the another movement information; and
    when the new geographical movement information and the another movement information have informational correlation greater than a predetermined threshold, correct at least a part of the route information using the new geographical location information.

4. The electronic device of claim 1, wherein, when the movement information is acquired for less than a predetermined required time or indicates less than a predetermined movement distance, the programming instructions are further executable by the at least one processor to cause the electronic device to generate estimated route information utilizing intervals different than the at least one interval between the first location and the second location using the movement information.

5. The electronic device of claim 1, wherein, when the movement information fails to satisfy a predetermined condition, the programming instructions are further executable by the at least one processor to cause the electronic device to provide an interface for receiving input of information corresponding to intervals different than the at least one interval between the first location and the second location.

6. The electronic device of claim 1, wherein the programming instructions are further executable by the at least one processor to cause the electronic device to output at least one of a number of consumed calories or energy consumption of a vehicle associated with travel along the generated route information.

7. The electronic device of claim 1, wherein the programming instructions are further executable by the at least one processor to cause the electronic device to correct the acquired movement information based on a map.

8. The electronic device of claim 1, wherein the programming instructions are further executable by the at least one processor to cause the electronic device to control a time period for which the absolute geographical location information is acquired based on at least one of a speed and a remaining power of the electronic device.

9. The electronic device of claim 1, wherein at least one processor detects absolute geographical location and the at least one sensor detects route information, and wherein the programming instructions are further executable by the at least one processor to cause the electronic device to display the generated route information via a display operatively coupled to the electronic device.

10. A method of operating an electronic device, comprising:
- in response to detecting that global positioning system (GPS) detection is unavailable by a GPS sensor, determining by at least one sensor a present location as a first location;
- acquiring movement information by the at least one sensor as the electronic device moves from the first location while the GPS detection is unavailable;
- in response to detecting reactivation of GPS detection by the GPS sensor, detecting a new present location by the GPS sensor, the new present location indicating a second location detected via absolute geographic location information detected by the GPS sensor;
- determining whether at least one of an acquisition time of the acquired movement information or an acquisition distance of the acquired movement information satisfies a pre-determined condition indicating at least one of a requisite time and distance; and
- in response to detecting that the at least one of the acquisition time and the acquisition distance satisfies the pre-determined condition, generating historical route information indicating at least one interval between the first location and the second location previously traversed by the electronic device while GPS detection was unavailable, based on the acquired movement information detected while GPS detection was unavailable, and the new present location detected by the reactivated GPS detection.

11. The method of claim 10, wherein the acquiring of the absolute geographical location information comprises controlling a time period for which the absolute geographical location information is acquired based on at least one of a speed and a remaining power of the electronic device, the method further comprising:
- in response to detecting that the at least one of the acquisition time and the acquisition distance fails to satisfy the pre-determined condition, executing display of an input interface requesting input of additional geographic information relevant; and
- generating the historical route information based on the acquired movement information, the new present location, and the additional geographic information received via the input interface.

12. The method of claim 10, wherein when the movement information is acquired for less than a predetermined required time or indicates less than a predetermined movement distance, generating estimated route information utilizing intervals different than the at least one interval between the first location and the second location using the movement information.

13. The method of claim 10, wherein when the movement information fails to satisfy a predetermined condition, providing an interface for receiving input of information corresponding to intervals different than the at least one interval between the first location and the second location from a user.

14. The method of claim 10, wherein the generating of the route information comprises outputting at least one of a number of consumed calories or energy consumption of a vehicle associated with travel along the generated route information.

15. The method of claim 10, wherein the generating of the route information comprises correcting the acquired movement information based on a map.

16. The method of claim 10, wherein the electronic device includes a reception module for detecting absolute geographical location, and at least one sensor for detecting route information of the electronic device, and
- wherein the generating of the route information comprises displaying the route information through a display operatively coupled to the electronic device.

* * * * *